United States Patent
Kato et al.

(10) Patent No.: US 7,892,143 B2
(45) Date of Patent: Feb. 22, 2011

(54) SHIFT CONTROL APPARATUS

(75) Inventors: Masayuki Kato, Toyota (JP); Tatsuhiro Miyake, Kariya (JP); Daisuke Ido, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 481 days.

(21) Appl. No.: 12/090,548

(22) PCT Filed: Oct. 18, 2006

(86) PCT No.: PCT/IB2006/003337

§ 371 (c)(1),
(2), (4) Date: Apr. 17, 2008

(87) PCT Pub. No.: WO2007/045999

PCT Pub. Date: Apr. 26, 2007

(65) Prior Publication Data
US 2008/0248924 A1 Oct. 9, 2008

(30) Foreign Application Priority Data
Oct. 18, 2005 (JP) ............................. 2005-303248

(51) Int. Cl.
*F16H 10/10* (2006.01)
(52) U.S. Cl. .................. 477/115; 477/107; 477/110
(58) Field of Classification Search ................ 477/107, 477/110, 115, 124
See application file for complete search history.

(56) References Cited

U.S. PATENT DOCUMENTS

| | | | |
|---|---|---|---|
| 5,150,634 A * | 9/1992 | Wakahara | 477/125 |
| 5,498,216 A | 3/1996 | Bitsche et al. | |
| 5,772,550 A * | 6/1998 | Kamada et al. | 475/120 |
| 7,476,176 B2 * | 1/2009 | Ibamoto et al. | 477/15 |
| 2007/0012538 A1 * | 1/2007 | Katakura et al. | 192/3.61 |

FOREIGN PATENT DOCUMENTS

| | | |
|---|---|---|
| DE | 198 41 856 C1 | 12/1999 |
| JP | 59-069561 A | 4/1984 |
| JP | 06-20127 U | 3/1994 |
| JP | 2001-311466 A | 11/2001 |
| JP | 2003-240115 A | 8/2003 |
| JP | 2004-523705 A | 8/2004 |
| JP | 2005-226700 A | 8/2005 |
| WO | 02/36995 A2 | 5/2000 |
| WO | 02/060715 A1 | 8/2002 |

OTHER PUBLICATIONS

Japanese Office Action for corresponding Japanese Patent Application No. JP 2005-303248 drafted Nov. 26, 2009 and issued on Dec. 1, 2009, 4 pages.

* cited by examiner

Primary Examiner—Ha D. Ho
(74) Attorney, Agent, or Firm—Sughrue Mion, PLLC

(57) ABSTRACT

An ECU executes a program that includes the steps of performing neutral shift control, clutch release control, and engine torque control when a shift is required, the ste of moving a shift selector shaft in a selecting direction when a gear is disengaged and a shift position is neutral even if a drive torque TQ is greater than α and a clutch stroke C is less than β, the step of performing synchro control, the step of performing clutch engagement control, and the step of performing gear engagement control.

9 Claims, 12 Drawing Sheets

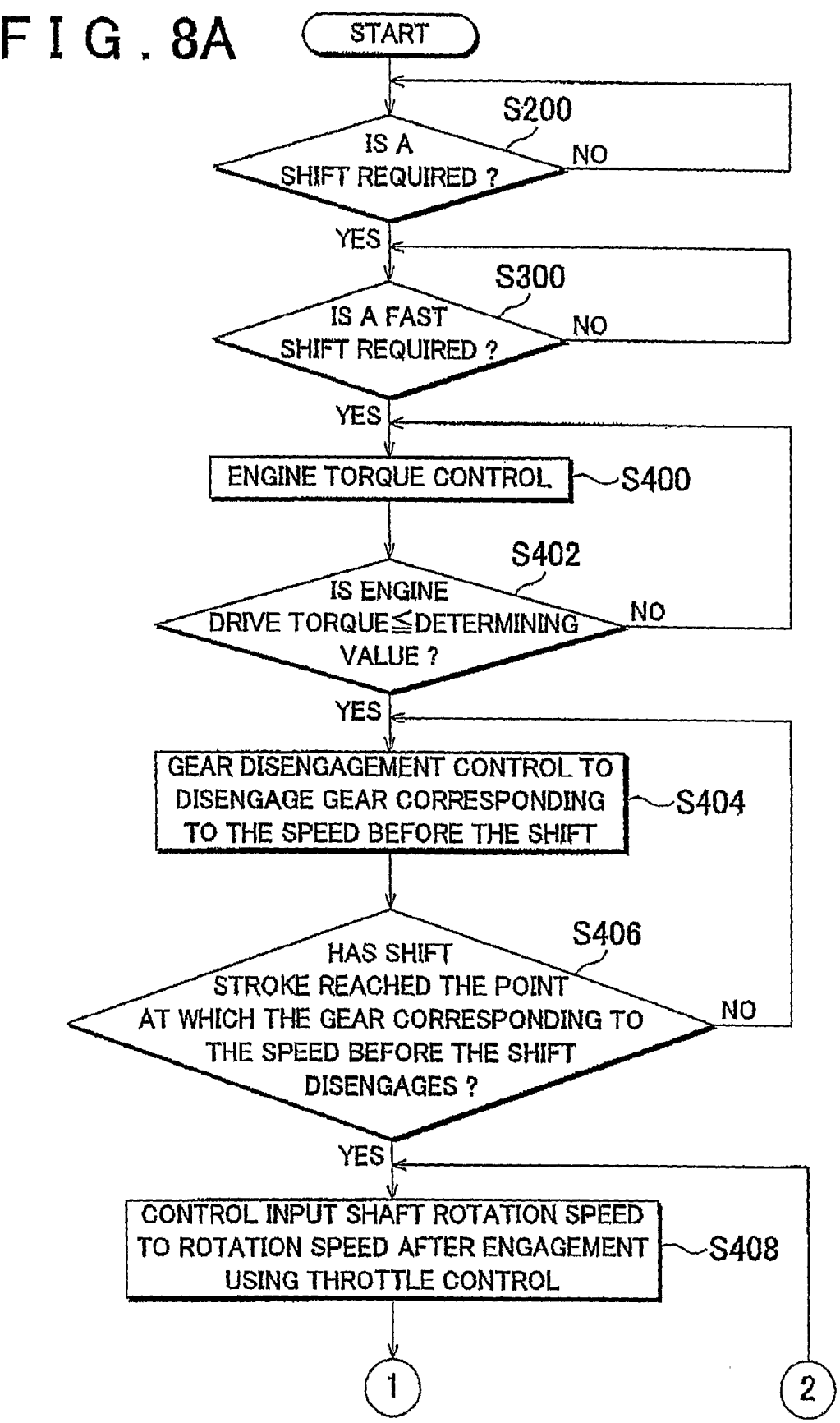

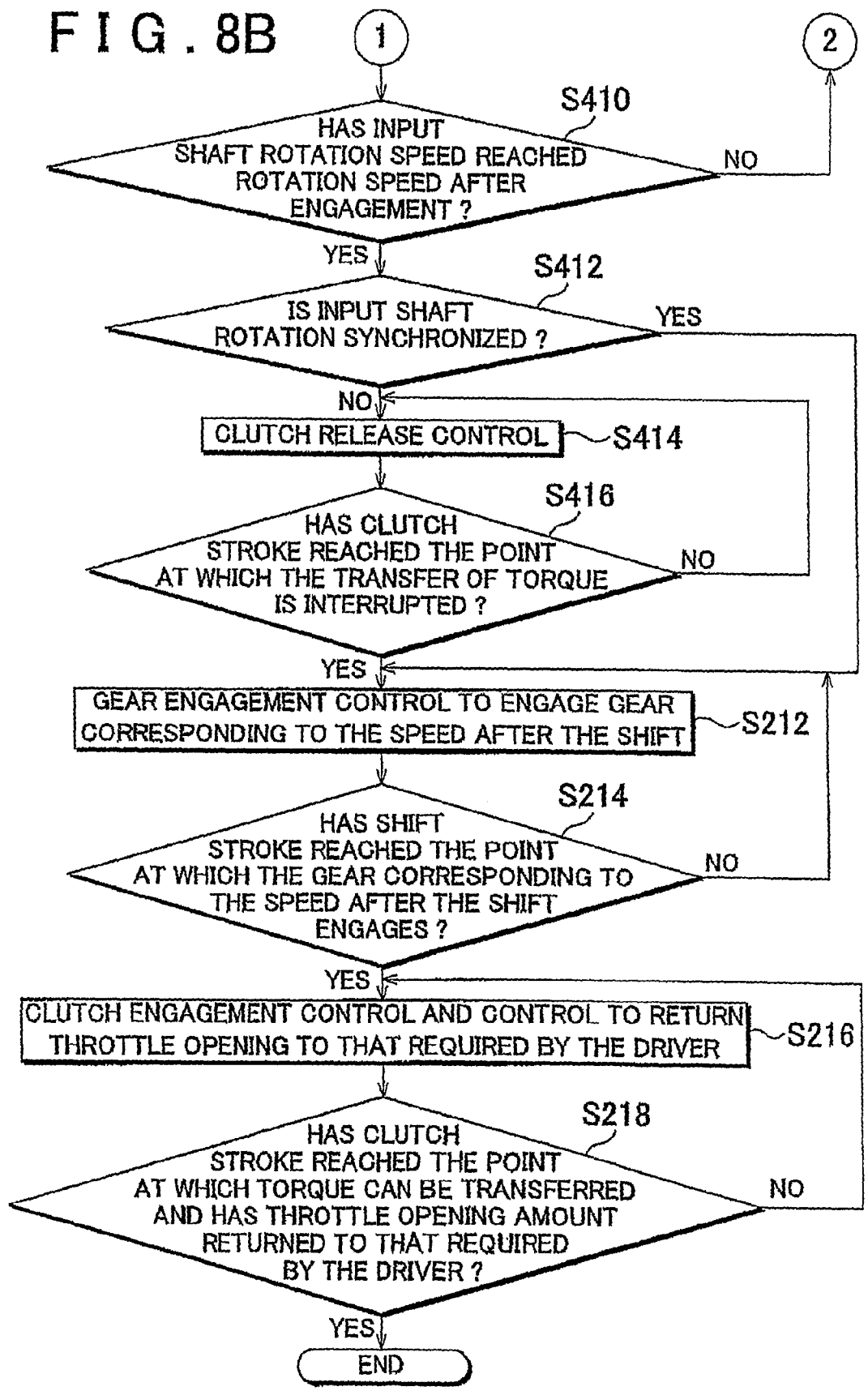

SHIFT CONTROL APPARATUS

BACKGROUND OF THE INVENTION

The disclosure of Japanese Patent Application No. 2005-303248 filed on Oct. 18, 2005, including the specification, drawings and abstract is incorporated herein by reference in its entirety.

1. Field of the Invention

The invention relates to a shift control apparatus of a constant mesh transmission. More particularly, the invention relates to a shift control which, when a shift is required, performs an operation to return the shift position from the speed before the shift to neutral in parallel with performing an operation to switch a clutch from an engaged state to a released state.

2. Description of the Related Art

A transmission that includes a constant mesh gear train is known which performs a shift not manually, but automatically using an actuator and the like. In a vehicle provided with such a transmission, a clutch provided between an engine and the transmission is operated by the actuator and the like. In this kind of transmission, a shift is preferably performed quickly during rapid acceleration or starting from a standstill on a hill, for example.

For example, Japanese Utility Model Publication HEI 6-20127 describes a shift control apparatus of a transmission in which a driver can request an early shift when necessary, such as when accelerating rapidly or starting from a standstill on a hill. This shift control apparatus is a shift control apparatus for an electronically controlled mechanical automatic transmission which has a main transmission and sub-transmission with a hi-lo two-speed shifting range. This shift control apparatus is provided with a rapid shift request switch to be used when the driver wants to shift early. The shift control apparatus also has a control device which releases a clutch in response to receiving a signal from the rapid shift request switch and disengages the gear of the main transmission While simultaneously shifting the sub-transmission, and then engaging the gear of the main transmission after that shift operation is complete.

According to the shift control apparatus described in the foregoing publication, the shifting time can be reduced if the shift is performed when a rapid shift switch, which is provided on a shift lever, is on or when an accelerator pedal is being depressed to a kick down region which corresponds to a rapid shift request switch when a rapid shift is required, such as when accelerating rapidly or starting from a standstill on a hill.

In addition, technology is also known which performs a shift either while keeping the clutch engaged or after releasing the clutch depending on the state of the vehicle in order to reduce the shifting time when shifting on an upgrade, for example. For example, Published Japanese National Phase Application 2004-523705 of PCT application describes an automatic mechanical shifting system which issues a command to perform either a dynamic shift operation which is performed while keeping the master clutch engaged, or a dynamic shift operation that is performed to reengage the master clutch after first releasing it. This automatic mechanical shifting system is a vehicular automatic mechanical shifting mechanism which has an operator for an automatic master clutch and a system controller. When performing a dynamic shift operation from a selected speed ratio to a target speed ratio, the system controller uses control logic effective for evaluating which is more effective from among (i) a shift sequence performed while the master clutch is still engaged, and (ii) a shift sequence that includes reengaging the master clutch after it has first been released, and then executing the more effective shift sequence.

According to the automatic mechanical shift system described in the foregoing publication, when performing a dynamic shift operation from a selected speed ratio to a target speed ratio, it is possible to evaluate which is more effective from among (i) a shift sequence performed while the master clutch is still engaged, and (ii) a shift sequence that includes reengaging the master clutch after it has first been released, and then execute the more effective shift sequence.

The shift control apparatus described in Japanese Utility Model Publication HEI 6-20127, however, shortens the shifting time by performing a plurality of continuously performed shift operations in parallel in each of a plurality of transmissions, but does not consider performing a plurality of shift operations in a single transmission Therefore, even if the shifting time is to be shortened by performing an operation to release an engaged clutch in parallel with an operation to return the shift position to neutral during a shift, suddenly interrupting the transmission of power while a large amount of torsion due to torque fluctuation is generated between the input shaft and output shaft of the transmission may result in shock being produced when that torsion is released.

Therefore, while it is possible to control the torque output from the engine like the automatic mechanical shift system described in Published Japanese National Phase Application 2004-523705 of PCT application does, the automatic mechanical shift system described in Published Japanese National Phase Application 2004-523705 of PCT application performs control to reduce the torque output from the engine while the clutch is engaged. Accordingly, no consideration is given to the fact that torque transmitted from the clutch to the transmission fluctuates according to a change in the state of the clutch (such as a change from engaged to released). Therefore, when shift control is to be performed with good responsiveness, shock may be produced by fluctuations in the torque transmitted from the clutch to the transmission.

SUMMARY OF THE INVENTION

In view of the foregoing problems, this invention thus provides a shift control apparatus which improves responsiveness during shift control while suppressing shock caused by torque fluctuation during a shift.

A first aspect of the invention thus provides a shift control apparatus for a constant mesh transmission which is connected via a clutch to a power source mounted in a vehicle. This transmission shifts speeds by a gear which corresponds to a desired speed being engaged when a shift selecting member is shifted to a position corresponding to that desired speed. This shift control apparatus includes a drive torque detecting device that detects drive torque output from the power source, a transfer torque detecting device that detects transfer torque transferred from the clutch to the transmission, a load torque detecting device that detects load torque transferred from a driven wheel of the vehicle to the transmission, a switching device that switches the clutch from an engaged state to a released state when the shift is required while the vehicle is running, and a first shift controlling device that controls, in parallel with switching the clutch, the shift selecting member such that the engaged gear disengages when the load torque becomes greater than at least one of the drive torque and the transfer torque.

According to the shift control apparatus as described above, when the load torque transferred from the driven wheel of the vehicle to the transmission becomes greater than at least one of the drive torque and the transfer torque, the shift control apparatus moves the shift selecting member to disengage the engaged gear. The point at which the load torque becomes greater than at least one of the drive torque and the transfer torque is the point at which the torque applied to the input shaft of the transmission (i.e., the drive torque or the transfer torque) and the torque applied to the output shaft of the transmission (i.e., the load torque) are substantially equal, or the point at which the magnitude relation thereof reverses. When the torque applied to the input shaft of the transmission becomes substantially the same as the torque applied to the output shaft of the transmission, the torque fluctuation in the power transmission path decreases. Also, when the magnitude relation of the torque applied to the input and output shafts of the transmission reverses, the shaft in the power transmission path inside the transmission twists in the opposite direction so the torsion in the shaft decreases. Shock caused by torque fluctuation can be effectively suppressed at this time by moving the shift selecting member to disengage the gear corresponding to the speed. Also, as the clutch is released, the transfer torque applied to the input shaft of the transmission decreases and thus quickly becomes less than the load torque. As a result, the operation to release the clutch and the operation to return the shift position to neutral can be performed in parallel because the shift selecting member starts to move immediately. Therefore, the shift selecting member can quickly start to move to the position corresponding to the speed after the shift. That is, the responsiveness of the shift control can be improved. Accordingly, a shift control apparatus can be provided which improves the responsiveness during shift control while suppressing shock caused by a fluctuation in torque during a shift.

The shift control apparatus described above may also include a drive torque controlling device that controls the drive torque output from the power source when the shift is required.

According to the shift control as described above, for example, when the power source is controlled to reduce the drive torque during shift control, that decrease in drive torque results in less drive torque being applied to the input shaft of the transmission. As a result, the drive torque quickly becomes less than the load torque. Accordingly, the shift selecting member quickly starts to move and thus can quickly start to move into a position corresponding to the speed after the shift. That is, the responsiveness of the shift control can be improved.

A second aspect of the invention provides a shift control apparatus for a constant mesh transmission which is connected via a clutch to a power source mounted in a vehicle. This transmission shifts speeds by a gear which corresponds to a desired speed being engaged when a shift selecting member is shifted to a position corresponding to that desired speed. This shift control apparatus includes an applying device that applies a force corresponding to a speed in a direction in which the engaged gear disengages to the shift selecting member when the shift is required while the vehicle is running, a switching device that switches the clutch from an engaged state to a released state in parallel with applying the force corresponding to the speed, a position detecting device that detects a position of the shift selecting member, and a second shift controlling device that moves the shift selecting member to a position corresponding to a speed after a shift when the detected position is the position at which the engaged gear disengages in the speed before the shift.

According to the shift control apparatus as described above, drive torque output from the power source or transfer torque transferred from the clutch is applied to the input shaft of the transmission while the vehicle is running. Load torque which is in the opposite direction of the drive torque and the transfer torque and transferred from the driven wheel by running resistance of the vehicle is applied to the output shaft of the transmission. After a shift is required while the vehicle is running, the clutch is switched so that it releases, which reduces the transfer torque. When the transfer torque decreases (or when the drive torque decreases following a reduction in output from the power source), the transfer torque (or the drive torque) and the load torque may be substantially equal or the magnitude relationship between the two may reverse. At this time, force corresponding to the speed is applied to the shift selecting member, causing it to move so that the gear corresponding to the speed disengages. When the transfer torque and the load torque are substantially equal, the torque fluctuation in the power transmission path decreases. Also, when the magnitude relation between the transfer torque and the load torque reverses, the amount of torsion for starting to twist the shaft between the input and output shafts of the transmission in the opposite direction decreases. At this time, the torque fluctuation or the torque applied to the gear corresponding to the speed decreases. Therefore, less force is required to disengage the engaged gear (i.e., less force is required to move the shift selecting member) so the shift selecting member moves from the force that was applied. Accordingly, the shift selecting member can be moved while no torque fluctuation is produced in the power transmission path, which enables shock caused by torque fluctuation in the power transmission path to be effectively suppressed. Also, by detecting the position at which the gear corresponding to the speed disengages, the shift selecting member can quickly start to move into the position corresponding to the speed after the shift. That is, the responsiveness of the shift control can be improved. Accordingly, a shift control apparatus can be provided which improves the responsiveness during shift control while suppressing shock caused by a fluctuation in torque during a shift.

In the shift control apparatus described above, the force corresponding to the speed may be a force required to move the shift selecting member when the gear corresponding to the speed changes from being engaged to being disengaged, and may be calculated based on load torque transferred from a driven wheel to the transmission by running resistance of the vehicle.

According to the shift control apparatus as described above, when a shift is required while the vehicle is running, a force corresponding to the speed is applied to the shift selecting member. When the torque input to the input shaft of the transmission (e.g., the transfer torque or the load torque) decreases after the shift is required, it becomes substantially the same as the torque input to the output shaft of the transmission (e.g., the load torque) or the magnitude relation between the two is reversed. At this time, at most, torque based on the load torque is applied to the gear corresponding to the speed of the transmission. Therefore, the shift selecting member starts to move from the force applied so that the gear corresponding to the speed disengages. As a result, the shift selecting member can quickly start to be moved to a position corresponding to the speed after the shift while effectively suppressing shock caused by torque fluctuation in the power transmission path.

The shift control apparatus described above may also include a torque detecting device that detects drive torque output from the power source, and a third shift controlling device that, when a gear corresponding to the speed before the shift is engaged and the detected drive torque is equal to or less than the load torque transferred from the driven wheel of the vehicle to the transmission, moves the shift selecting member to disengage the engaged gear.

According to the shift control apparatus as described above, when the drive torque output from the power source becomes equal to or less than the load torque, the shift selecting member is moved so that the engaged gear disengages. The point at which the drive torque becomes equal to or less than the load torque is the point at which the torque applied to the input shaft of the transmission (i.e., the drive torque) and the torque applied to the output shaft of the transmission (i.e., the load torque) are substantially equal, or the point at which the magnitude relation between the two reverses. When the drive torque and the load torque are substantially equal, the torque fluctuation in the power transmission path decreases. Also, when the magnitude relation between the drive torque and the load torque reverses, the shaft in the power transmission path inside the transmission twists in the opposite direction so the torsion on the shaft decreases. Shock caused by torque fluctuation can be effectively suppressed at this time by moving the shift selecting member to disengage the gear corresponding to the speed.

The shift control apparatus described above may also include a transfer torque detecting device that detects transfer torque transferred from the clutch to the transmission, and a fourth shift controlling device that, when a gear corresponding to the speed before the shift is engaged and the detected transfer torque is equal to or less than the load torque transferred from the driven wheel of the vehicle to the transmission, moves the shift selecting member to disengage the engaged gear.

According to the shift control apparatus as described above, when the transfer torque transferred from the clutch to the transmission becomes equal to or less than the load torque, the shift selecting member is moved so that the engaged gear disengages. The point at which the transfer torque becomes equal to or less than the load torque is the point at which the torque applied to the input shaft of the transmission (i.e., the transfer torque) and the torque applied to the output shaft of the transmission (i.e., the load torque) are substantially equal, or the point at which the magnitude relation between the two reverses. When the transfer torque and the load torque are substantially equal, the torque fluctuation in the power transmission path decreases. Also, when the magnitude relation between the transfer torque and the load torque reverses, the shaft in the power transmission path inside the transmission twists in the opposite direction so the torsion in the shaft decreases. Shock caused by torque fluctuation can be effectively suppressed at this time by moving the shift selecting member to disengage the gear corresponding to the speed. Also, as the clutch is released, the transfer torque applied to the input shaft of the transmission decreases and thus quickly becomes less than the load torque. As a result, the shift selecting member can start to move quickly so the release operation of the clutch and the operation to return the shift position to neutral can be performed in parallel. Accordingly, the shift selecting member can quickly start to move to a position corresponding to the speed after the shift. That is, the responsiveness of the shift control can be improved.

Also, in the transmission described above, when a fast shift is required, the switching of the clutch from the engaged state to the released state by the switching device, the drive torque control of the power source by the drive torque controlling device, and the shift control by the second shift controlling device or the third shift controlling device or the fourth shift controlling device may be executed in parallel, and when a fast shift is not required, the shift control by the second shift controlling device or the third shift controlling device or the fourth shift controlling device may be executed after the switching device switches the clutch from the engaged state to the released state.

According to the shift control apparatus as described above, when a fast shift is not required, shift control is performed with the clutch released (i.e., while torque is not being transferred) which enables shock caused by torque fluctuation in the power transmission path during shift control to be suppressed. Also, when a fast shift is required, engine control, clutch control, and shift control are all executed in parallel so shift control can be started earlier than it would be if it were executed after executing the engine control and the clutch control in parallel, which improves the responsiveness of the shift control. In this way, shift control desired by the driver can be realized by switching between a shift that can suppress shift shock and a fast shift depending on the needs of the driver, thus reducing discomfort felt by the driver during shifting.

Further, in the transmission described above, when a fast shift is required, a shift may be executed, without control to release the clutch, by controlling the power source after a gear corresponding to the speed before the shift is disengaged and controlling an input shaft rotation speed before the shift of the transmission to the input shaft rotation speed of the speed after the shift, and when a fast shift is not required, shift control may be executed by the second shift controlling device or the third shift controlling device or the fourth shift controlling device after the switching device switches the clutch from the engaged state to the released state.

According to the shift control apparatus as described above, in the transmission, when a fast shift is required, the input shaft rotation speed is controlled and synchronized during a shift achieved by switching gears, the control to release the clutch can be omitted, and the number of rotations that it takes to synchronize the rotation speed of the input shaft and the rotation speed of the output shaft by operating the synchromesh mechanism can be reduced, which shortens the shifting time and suppresses degradation of the synchromesh mechanism. As a result, the durability of the synchromesh mechanism can be improved.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIGS. 8A and 8B are flowcharts illustrating the control structure of a shift control program to be used when a fast shift is required, which is executed by an ECU which serves as a shift control apparatus according to a third example embodiment of the invention.

DETAILED DESCRIPTION OF THE PREFERRED EMBODIMENTS

Figure 1:
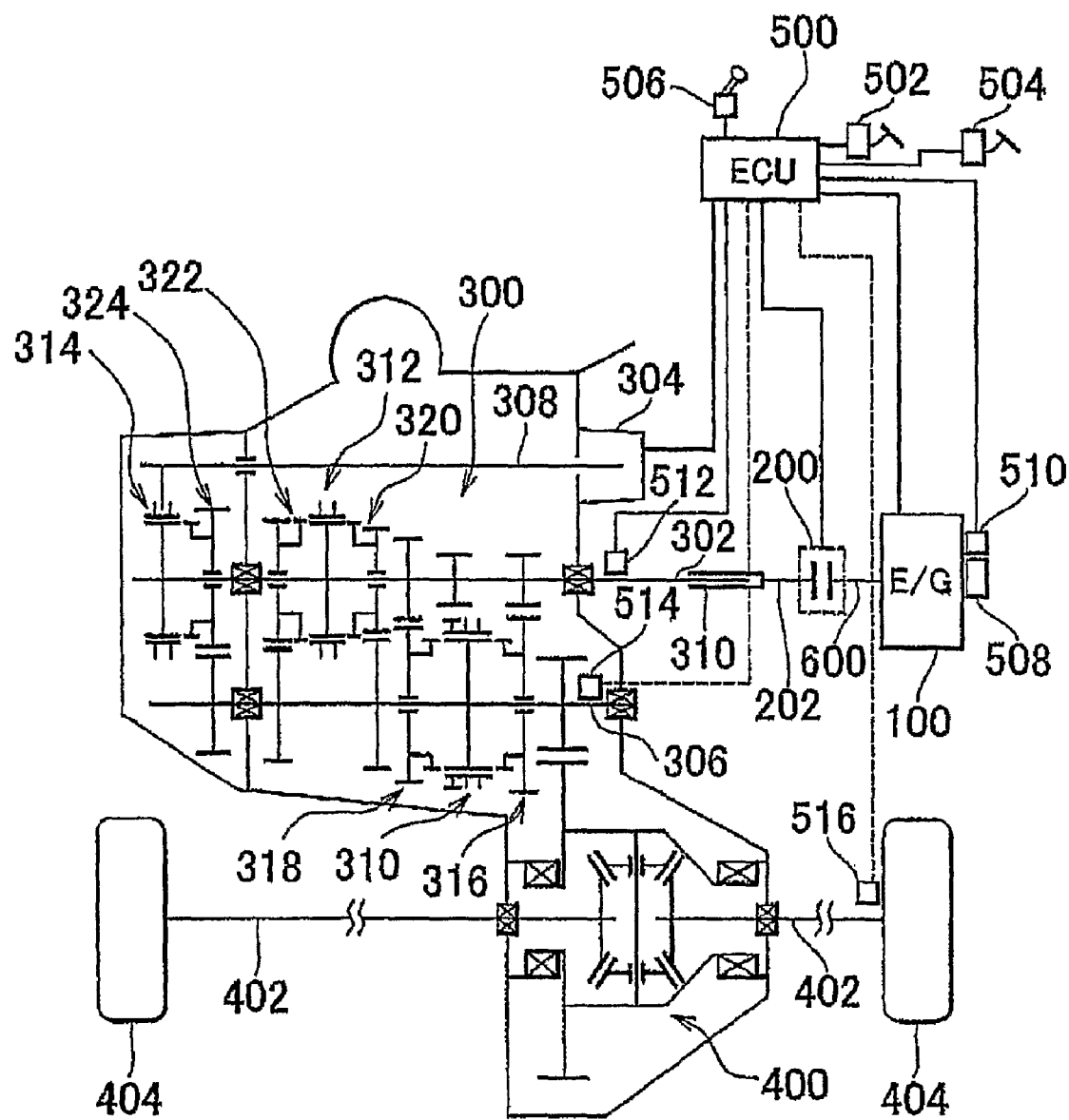
FIG. 1 is a control block diagram of a vehicle provided with a shift control apparatus according to a first example embodiment of the invention.

In the following description and the accompanying drawings, the present invention will be described in more detail with reference to exemplary embodiments. Also, in the description, like parts will be denoted by like reference numerals, have the same function, and be referred to by the same nomenclature throughout. Detailed descriptions thereof will not be repeated.

First Example Embodiment

A vehicle provided with a shift control apparatus according to a first example embodiment of the invention will first be described with reference to FIG. 1. This vehicle runs by driving force generated by an engine 100 being transmitted to driven wheels 404 via a clutch 200, a transmission 300, a differential gear 400, and a drive shaft 402. The engine 100, the clutch 200, and the transmission 300 are all controlled by an ECU Electronic Control Unit) 500. The shift control apparatus according to this first example embodiment is realized by a program executed in the ECU 500.

The clutch 200 is coupled to a crankshaft 600 of the engine 100. A clutch output shaft 202 is coupled to an input shaft 302 of the transmission 300 via splines 310.

The transmission 300 is formed of a constant mesh type gear train. A gear speed of the transmission 300 is selected by sliding a shift fork shaft 308 using an actuator 304.

In this example embodiment, there are three of these shift fork shafts 308 provided substantially parallel with one another inside the transmission 300. These three shift fork shafts 308 are each provided so as to be able to slide in their axial directions. A shift selector shaft is also provided orthogonal to the three shift fork shafts 308. This shift selector shaft corresponds to a "shift selecting member". The shift selector shaft is movably provided around the center axis and in a direction orthogonal to the shift fork shafts 308. A protruding portion is formed midway on the shift selector shaft. A groove into which the protruding portion of the shift selector shaft can fit (hereinafter also referred to as "engage") is formed in one end of each shift fork shaft 308 in the direction in which the shift selector shaft is able to move, i.e., in the direction orthogonal to the shift fork shafts 308. When the shift selector shaft moves in the direction orthogonal to the shift fork shafts 308 (i.e., a selecting direction), the protruding portion fits into the groove in one of the three shift fork shafts 308. When the shift selector shaft is rotated around its center axis (i.e., in a shifting direction) while the protruding portion of the shift selector shaft is fitted in the groove of one of the shift fork shafts 308, torque from the protruding portion is applied to the groove such that the shift fork shaft 308 slides in a direction parallel to its axis.

Hub sleeves 310, 312, and 314 which rotate in sync with the input shaft 302 or the output shaft 306 are retained on the other end of each of the shift fork shafts 308 by a shift fork. The hub sleeves 310 to 314 and gears which correspond to speeds both have correspondingly shaped splined structures formed thereon. When one of the shift fork shafts 308 slides, so does the corresponding hub sleeve 310, 312 or 314, and the splines on that hub sleeve mesh with the splines formed on one of the gears. As a result, one of the gears 316, 318, 320, 322, or 324 becomes coupled to (i.e., synchronized with) the input shaft 302 or the output shaft 306 and thus engaged. In order to prevent the splines on the hub sleeves 310 to 314 and the gears 316 to 324 from slipping out of mesh, the splines are shaped so that the abutting surfaces are angled (a tapered angle) in a different direction than the direction in which they engage. More specifically, the tip end portions of the splines on the hub sleeves 310 to 314 and the gears 316 to 324 are shaped so that the surface pressure on the abutting surfaces increases when force is applied in the direction in which they disengage. This increase in surface pressure on the abutting surfaces increases frictional force, thereby restricting movement in the direction in which they disengage.

Each shift fork provided on the other end of the three shift fork shafts 308 retains one of the three hub sleeves, i.e., the first speed-second speed hub sleeve 310, the third speed-fourth speed hub sleeve 312, and the fifth speed-reverse hub sleeve 314. Accordingly, for example, when the protruding portion on the shift selector shaft is engaged with the groove in the shift fork shaft 308 provided with the first speed-second speed hub sleeve 310 and slides that shift fork shaft 308 in one of the two movable directions (e.g., to the right in FIG. 1) the from a reference position (i.e., a neutral position), the first speed-second speed hub sleeve 310 becomes couple to the gear 316 that corresponds to first speed. When the shift fork shaft 308 slides in the other direction (e.g., to the left in FIG. 1), the first speed-second speed hub sleeve 310 becomes coupled to the gear 318 which corresponds to second speed. This is how the shift from first speed to second speed is performed. The shifts from third speed up to fifth speed are performed in a similar manner by one of the corresponding gears 320 to 324 meshing with one of the corresponding hub sleeves 312 or 314, so detailed descriptions of these shifts will be omitted. Also, although the transmission 300 in this example embodiment is described as being a five speed transmission, the invention is not particularly limited to this. Also, a synchromesh mechanism, for example, which synchronizes the rotation of a hub sleeve with the rotation of a gear may be used to couple the hub sleeves 310 to 314 to the gears 316 to 324, but because it is well known technology it will not be described in detail here.

In this example embodiment, a shift is performed by driving the shift selector shaft using the actuator 304 and sliding the shift fork shaft 308 that corresponds to the desired speed. The actuator 304 is formed by one or two or more motors, for example, and drives the shift selector shaft in the selecting direction and the shifting direction. The actuator 304 may be operated by hydraulic pressure but is not particularly limited to a motor.

A shift position detecting sensor, not shown, for detecting a position (a position in the selecting direction and a position in the shifting direction) of the shift selector shaft based on the operating amount of the motor described above is provided in the actuator 304. This shift position detecting sensor transmits a signal indicative of the detected position of the shift selector shaft to the ECU 500. The shift position detecting sensor may also directly detect the position of the shift selector shaft.

Various other sensors also transmit signals to the ECU 500. Some of these sensors include a shift amount detecting sensor, an accelerator depression amount sensor 502, a brake stroke sensor 504, a position sensor 506, a crank position sensor 510 provided opposite the outer periphery of a timing rotor 508, an input shaft rotation speed sensor 512, an output shaft rotation speed sensor 514, and a vehicle speed sensor 516.

The accelerator depression amount sensor 502 detects a depression amount of an accelerator pedal. The brake stroke sensor 504 detects an operating amount (depression amount) of a brake pedal. The position sensor 506 detects a shift position of a shift lever.

The crank position sensor 510 detects an engine speed NE. More specifically, the ECU 500 detects the engine speed NE based on the duration of one pulse of a pulse signal transmitted from the crank position sensor 510.

The input shaft rotation speed sensor 512 detects a rotation speed NI of the input shaft 302 of the transmission 300. More specifically, the ECU 500 detects the input shaft rotation speed NI based on the duration of one pulse of a pulse signal transmitted from the input shaft rotation speed sensor 512.

The output shaft rotation speed sensor 514 detects a rotation speed of the output shaft 306 of the transmission 300. More specifically, the ECU 500 detects the output shaft rotation speed based on the duration of one pulse of a pulse signal transmitted from the output shaft rotation speed sensor 514.

The vehicle speed sensor 516 detects a rotation speed NO of the driven wheels 404. More specifically, the ECU 500 detects the shaft rotation NO of the driven wheels 404 based on the duration of one pulse of a pulse signal transmitted from the vehicle speed sensor 516. The vehicle speed is also calculated from the rotation speed NO of the driven wheels 404. Further, acceleration (including deceleration) is calculated from the vehicle speed.

The ECU 500 performs computations based on the signals transmitted from these sensors, as well as shift lines, maps, and programs stored in memory, not shown. The ECU 500 then controls the engine 100, clutch 200, and transmission 300 accordingly.

The clutch 200 will now be described with reference to FIG. 2. The clutch 200 is a dry-operating single disc friction clutch. As shown in the drawing, the clutch 200 includes a clutch output shaft 202, a clutch disc 204 arranged on the clutch output shaft 202, a clutch housing 206, a pressure plate 208 arranged in the clutch housing 206, a diaphragm spring 210, a clutch release cylinder 212, a release fork 214, and a release sleeve 216.

Figure 2:
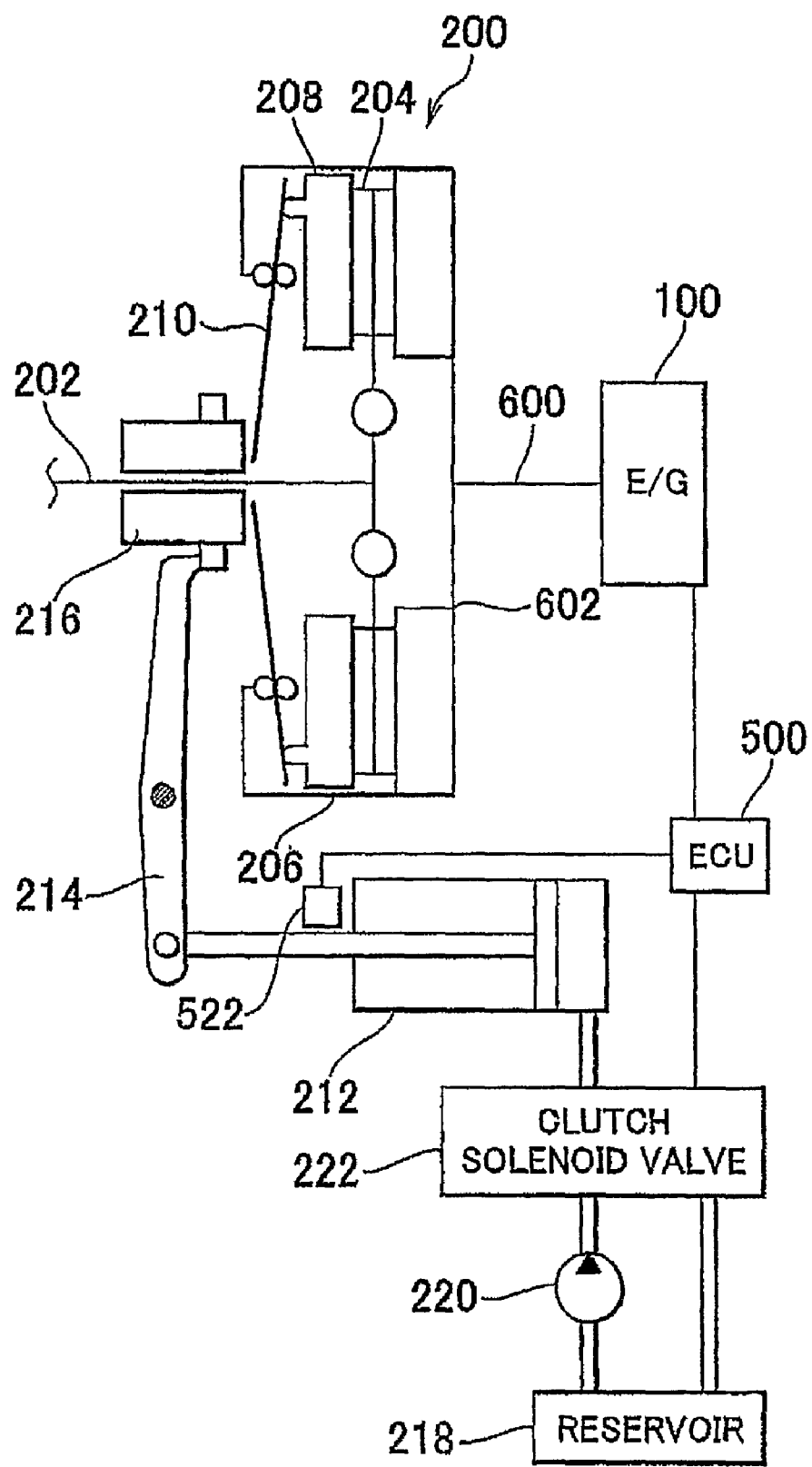
FIG. 2 is a view of a clutch in the vehicle provided with the shift control apparatus according to the first example embodiment of the invention.

The diaphragm spring 210 urges the pressure plate 208 to the right in FIG. 2, which presses the clutch disc 204 against a flywheel 602 that is mounted on a crankshaft 600 of the engine 100, thereby engaging the clutch.

The clutch release cylinder 212 moves the release sleeve 216 to the right in FIG. 2 via the release fork 214, which in turn moves an inside end portion of the diaphragm spring 210 to the right in the drawing. When the inside end portion of the diaphragm spring 210 moves to the right in the drawing, the pressure plate 208 moves to the left in the drawing such that the clutch disc 204 separates from the flywheel 602, thereby releasing the clutch.

The clutch release cylinder 212 operates by hydraulic pressure from hydraulic fluid which is drawn up from a reservoir 218 by a hydraulic pump 220 and supplied via a clutch solenoid valve 222. This clutch solenoid valve 222, which is controlled by the ECU 500, switches between supplying hydraulic pressure to the clutch release cylinder 212 and discharging hydraulic pressure from the clutch release cylinder 212.

When hydraulic pressure is supplied to the clutch release cylinder 212, it forces a piston in the clutch release cylinder 212 to move to the left in FIG. 2, which causes the release sleeve 216 to move to the right in the drawing, thereby releasing the clutch. The position of the piston in the clutch cylinder 212 (i.e., the clutch stroke) is detected by a clutch stroke sensor 522 which transmits a signal indicative of the detection results to the ECU 500.

The ECU 500 then determines whether the clutch 200 is released, engaged, or partially engaged based on the signal transmitted from the clutch stroke sensor 522. Incidentally, the clutch 200 may also be operated electrically.

When a shift of the transmission 300 is required either according to the running state or by a driver when the vehicle is running, the ECU 500 mounted in a vehicle having a structure such as that described above controls the actuator 304 to apply a force corresponding to a speed to the shift selector shaft in a direction toward neutral so that the engaged gear becomes disengaged (i.e., in a direction in which the splines of the hub sleeve disengage from the splines of the gear). In parallel with applying this force, the ECU 500 controls the clutch 200 so that it switches from an engaged state to a released state. When the shift selector shaft reaches the position at which the gear corresponding to the speed before the shift disengages, the ECU 500 then controls the actuator 304 to move the shift selector shaft to a position corresponding to a speed after the shift. In this invention, the ECU 500 performs the foregoing operation.

The "force corresponding to the speed" is the force required to move the shift selector shaft when the gear corresponding to the speed is moved from an engaged state to a disengaged state, and is calculated based on load torque transmitted to the transmission 300 from the driven wheels 404 by the running resistance of the vehicle.

That is, the force corresponding to the speed is the force required to move the hub sleeve in the axial direction so that the splines on the hub sleeve disengage from the splines on the gear when a force based on the load torque is applied to the splines on the hub sleeve and the splines on the gear.

The load torque is torque calculated based on the running resistance of the vehicle and differs depending on the vehicle speed. This load torque is calculated, for example, by the vehicle speed and a preset approximation formula. Alternatively, a map of the relationship between the vehicle speed and the load torque may be stored in the memory of the ECU 500 in advance and the load torque calculated using that map and the speed detected by the vehicle speed sensor 516. Or, a sensor, not shown, may be provided and the load torque detected directly. Also, the drive torque output from the engine 100 and the transfer torque transferred from the clutch 200 to the transmission may also either be calculated by the ECU 500 or directly detected by sensors, not shown, which may be provided. When, for example, the clutch is engaged and the load torque is substantially the same as the drive torque, the vehicle runs at a constant vehicle speed.

The calculated load torque is converted to the torque of the rotating shaft of the hub sleeve. The load on the circumference of the gear engaged with the hub sleeve is calculated by dividing the load torque that was converted to the torque of the rotating shaft of the hub sleeve by the gear diameter. The component force in the axial direction of the load torque produced by the tapered angle of the splines is then calculated. This component force is the force operating in the direction in which the splines engage when force based on the load torque is applied to the splines of the hub sleeve and the splines of the gear. Therefore, the force required to move the shift selector shaft is the sum of the calculated component force plus a suitable value that accounts for variation absorption and the like. Because the gear diameter is different for each speed, the force corresponding to the speed must be calculated for each speed.

Figure 3A:
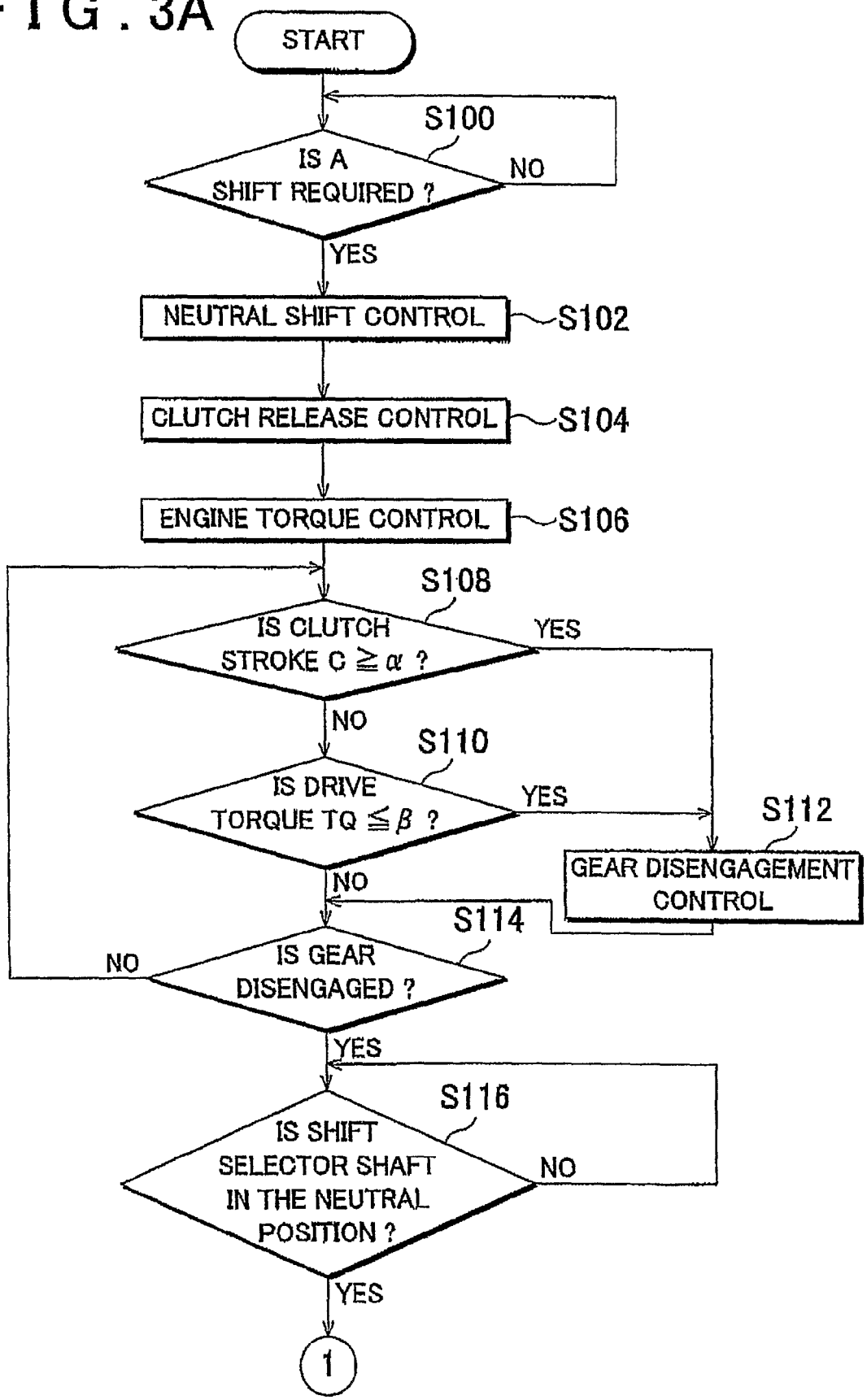
FIGS. 3A and 3B are flowcharts illustrating the control structure of a program executed by an ECU which serves as the shift control apparatus according to the first example embodiment of the invention.
Figure 3B:
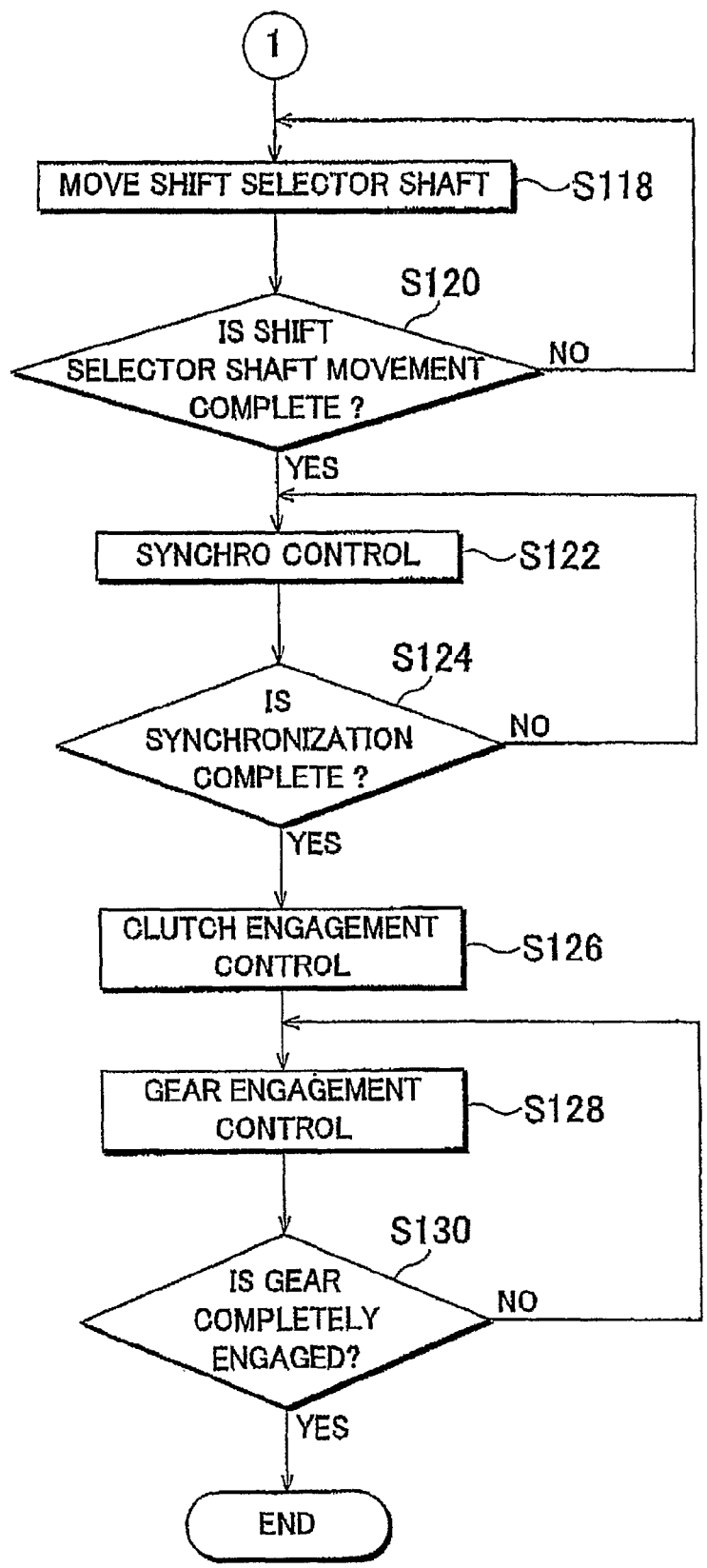

Hereinafter, the control structure of a program executed by the ECU 500 which serves as the shift control apparatus according to this example embodiment will be described with reference to FIGS. 3A and 3B.

First, in step S100 the ECU 500 determines whether a shift is required. The ECU 500 determines whether an upshift or a downshift is required according to the running state of the vehicle, for example. The ECU 500 may determine whether a shift is required according to a preset shift map based on the vehicle speed and the throttle opening amount. Alternatively, the ECU 500 may determine whether a shift is required by detecting a shift lever or paddle shift operation by a driver. If a shift is required (i.e., yes in step S100), then the process proceeds onto step S102. If not (i.e., NO in step S100), then step S100 is repeated.

In step S102, the ECU 500 starts a neutral shift control, which is control that applies a force corresponding to a speed to the shift fork shaft 308 in the neutral direction (i.e., the direction placing the transmission in neutral). More specifically, the ECU 500 controls the actuator 304 to apply a force corresponding to the speed to the shift selector shaft in the direction that disengages the splines on the hub sleeve from the splines on the gear.

In step S104, the ECU 500 starts clutch release control. More specifically, the ECU 500 sends a control signal to the clutch solenoid valve 222 to release the clutch 200.

In step S106, the ECU 500 starts engine torque control. For example, when an upshift is required, the ECU 500 performs control to reduce the drive torque TQ of the engine 100. More specifically, the ECU 500 sends a control signal to the throttle motor to reduce the throttle opening amount. Alternatively, the ECU 500 may send a control signal to an injector to reduce the fuel injection quantity.

In step S108, the ECU 500 determines whether the clutch stroke C of the clutch 200 detected by the clutch stroke sensor 522 is equal to or greater than a preset value $\alpha$. This preset value $\alpha$ is the clutch stroke when the transfer torque of the clutch 200 is substantially the same as the load torque transferred from the driven wheels 404 to the transmission 300. If the clutch stroke C is equal to or greater than this preset value $\alpha$ (i.e., if YES instep S108), the process proceeds on to step S112. If not (i.e., if NO in step S108), the process proceeds on to step S110.

In step S110, the ECU 500 determines whether the drive torque TQ output from the engine 100 is equal to or less than a preset value $\beta$. The drive torque TQ of the engine 100 may be directly detected, or may be estimated from, for example, the throttle opening amount, the engine speed, the fuel injection quantity and the intake air quantity, and the intake air temperature and the like. The preset value $\beta$ is the drive torque when the transfer torque of the clutch 200 is substantially the same as the load torque transferred from the driven wheels 404 to the transmission 300. If the driven torque TQ is equal to or less than the preset value $\beta$ (i.e., YES in step S110), then the process proceeds on to step S112. If not (i.e., NO in step S110), the process proceeds on to step S114.

In step S112, the ECU 500 performs gear disengagement control, in which the ECU 500 controls the actuator 304 to disengage the splines on the hub sleeve from the splines on the gear corresponding to the speed before the shift.

In step S114, the ECU 500 determines whether the gear is disengaged. That is, the ECU 500 determines whether the splines on the hub sleeve are disengaged from the splines on the gear corresponding to the speed before the shift. The ECU 500 determines whether the position of the shift selector shaft detected by the shaft position detecting sensor is farther toward the neutral side than the position of the shift selector shaft when the splines on the hub sleeve disengage from the splines on the gear.

More specifically, the ECU 500 determines whether {(the shift stroke)−(a speed learning value)} is equal to or greater than a preset value $\gamma$. The speed learning value is a learning value that corresponds to each speed. Because the shift stroke at which the splines on the hub sleeve disengage from the splines on the gear may change due to deterioration over time or the like, this learning value is used to correct any resulting offset in that shift stroke. The learning value may be calculated, for example, as follows. When a predetermined learning condition is satisfied, the ECU 500 operates the actuator 304 and detects the operating range of the shift selector shaft using the shaft position sensor or the like. The learning value is then calculated as the difference between that operating range and an initial value or the operating range during the last learning. If it is determined that the gear is disengaged (i.e., YES in step S114), then the process proceeds on to step S116. If not (i.e., NO in step S114), then the process returns to step S108.

In step S116, the ECU 500 determines whether the shift selector shaft is in the position corresponding to neutral. Here, the ECU 500 determines whether the position of the shift selector shaft detected by the shift position detecting sensor is a position indicating that all of the shift fork shafts 308 are in reference positions. If the shift selector shaft is in a position corresponding to neutral (i.e., YES in step S116), then the process returns to step S118. If not (i e., NO in step S116), then step S116 is repeated.

In step S118, the ECU 500 moves the shift selector shaft in the selecting direction. The ECU 500 sends a control signal to the actuator 304 to engage the protruding portion of the shift selector shaft with the groove in the shift fork shaft 308 corresponding to the speed after the shift.

In step S120, the ECU 500 determines whether the shift selector shaft has finished moving in the selecting direction. That is, the ECU 500 determines whether the position of the shift selector shaft in the selecting direction that was detected by the shift position detecting sensor is the position corresponding to the speed after the shift. If the shift selector shaft has finished moving in the selecting direction (i.e., YES in step S120), the process proceeds on to step S122. If not (i.e., NO in step S120), then the process returns to step S118.

In step S122, the ECU 500 starts synchro control, which is control that synchronizes the rotation speed of the input shaft of the transmission 300 with the rotation speed of the output shaft of the transmission 300. That is, the ECU 500 synchronizes the rotation of the hub sleeve with the rotation of the gear. Then the ECU 500 controls the actuator 304 to slide the shift fork shaft 308 so that the hub sleeve and the gear are placed in a predetermined positional relationship (e.g., such that a predetermined shift stroke before the hub sleeve and the gear corresponding to the speed after the shift are engaged is achieved). Once the hub sleeve and the gear are in the predetermined positional relationship, a synchromesh mechanism is operated to synchronize the rotation of the hub sleeve with the rotation of the gear.

In step S124, the ECU 500 determines whether the synchro control is complete. For example, the ECU 500 determines whether the rotation of the hub sleeve is in synch with the rotation of the gear based on the rotation speed NI of the input shaft 302 detected by the input shaft rotation speed sensor 512 and the rotation speed of the output shaft 306 detected by the output shaft rotation speed sensor 514. If the synchro control is complete (i.e., YES in step S124), the process proceeds on to step S126. If not (i.e., NO in step S124), the process returns to step S122.

In step S126, the ECU 500 starts control to engage the clutch 200, whereby the ECU 500 controls the clutch 200 so that it engages. This control to engage the clutch 200 may be performed either after or in parallel with gear engagement control, which will be described later.

In step S128, the ECU 500 performs the gear engagement control, whereby the ECU 500 controls the actuator 304 to slide the shift fork shaft 308 corresponding to the speed after the shift into a gear position that corresponds to the speed after the shift. At this time the splines on the hub sleeve engage with the splines on the gear corresponding to the speed after the shift.

In step S130, the ECU 500 determines whether the gear is completely engaged. Here, the ECU 500 determines whether the position of the shift selector shaft detected by the shift position detecting sensor is the position that corresponds to the speed after the shift. If the gear is completely engaged (i.e., YES in step S130), the routine ends. If not (i.e., NO in step S130), the process returns to step S128.

The operation of the ECU 500 which serves as the shift control apparatus according to this example embodiment based on the flowchart and the structure described above will now be described with reference to FIG. 4.

Figure 4:
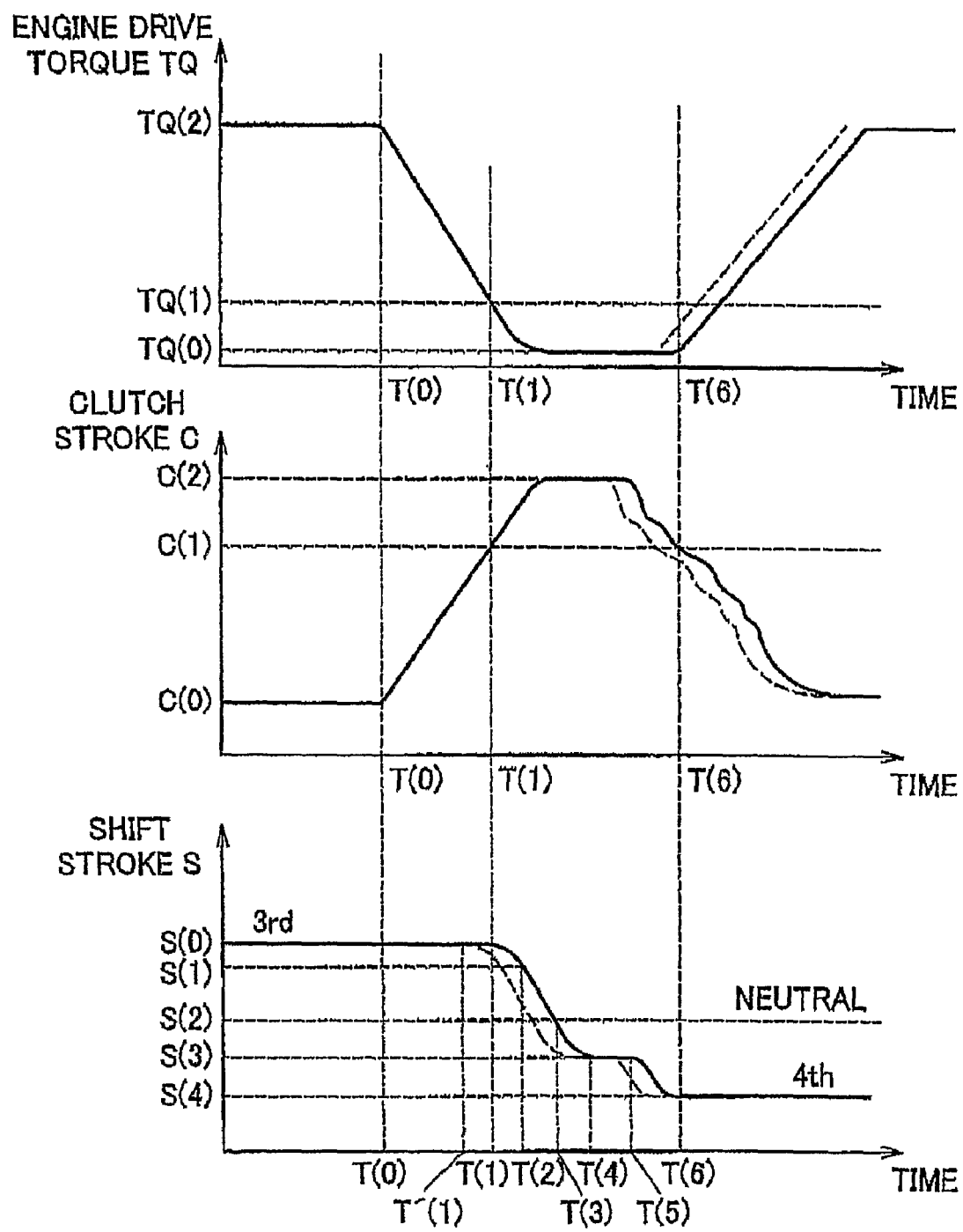
FIG. 4 is a timing chart showing the operation of the ECU which serves as the shift control apparatus according to the first example embodiment of the invention.

While the vehicle is running, the drive torque TQ of the engine 100 is TQ(2), the clutch stroke C is C(0) indicating complete engagement of the clutch 200, and the shift stroke S is S(0) indicating third speed, as shown in the top section of FIG. 4.

At time T(0), when an upshift from third speed to fourth speed is required either according to the running state of the vehicle or from a shift operation by the driver (i.e., YES in step S100), a force corresponding to the third speed gear 320 is applied in the neutral direction to the shift selector shaft by the actuator 204 (step S102). Then the clutch stroke C is controlled to increase from C(0) (step S104). In addition, the drive torque TQ of the engine 100 is controlled to decrease from TQ(2) (step S106).

As shown in the middle section of FIG. 4, at time T(1) the clutch stroke C is C(1). If the clutch stroke C(1) is equal to or greater than α (i.e., YES in step S108), then the gear disengagement control is started at time T(1), as shown in the bottom section of FIG. 4 (step S112).

As shown in the top section of FIG. 4, at time T(1), the drive torque TQ of the engine 100 is TQ(1). If TQ(1) is equal to or less than β (i.e., YES in step S110), then the gear disengagement control is started at time T(1), as shown in the bottom section of FIG. 4 (step S112).

As shown in the bottom section of FIG. 4, at time T(2) when the shift stroke is S(1) which corresponds to a position where the third speed-fourth speed hub sleeve 312 disengages from the third speed gear 320, it is determined that the gear is disengaged (i.e., YES in step S114).

At time T(3) when the shift stroke S reaches S(2) which corresponds to the neutral position, it is determined that the shift position is neutral (i.e., YES in step S116). Also, because the shift is from third speed to fourth speed, there is no movement in the selecting direction (i.e., YES in steps S118 and S120).

At time T(4) when the shift stroke S reaches S(3) which corresponds to a predetermined position corresponding to fourth speed, the synchro control is started (step S122). At time T(5) when the synchro control is complete (i.e., YES in step S124), the clutch 200 is controlled to engage (step S126) and the actuator 304 is controlled so that the shift stroke S becomes S(4) which corresponds to a position where the splines of the third speed-fourth speed hub sleeve 312 engage with the splines on a fourth speed gear 322 (i.e., YES in steps S128 and S130).

At time T(6) when the shift control is complete, the drive torque TQ of the engine 100 increases corresponding to the needs of the driver (i.e., the accelerator depression amount) while the clutch 200 is kept engaged.

Here, after time T(0), when the transfer torque decreases according to a decrease in the drive torque TQ of the engine 100 or an increase in the clutch stroke C, even if the clutch stroke C is less than α (i.e., NO in step S108) and the drive torque TQ is greater than β (i.e., NO in step S110), the shift selector shaft may still be moved so that the third speed gear 320 disengages because force corresponding to the third speed gear 320 is being applied to the shift selector shaft. This is because a decrease in the drive torque TQ or the transfer torque may cause the torque input from the input shaft of the transmission 300 and the load torque transferred from the driven wheels 404 to the transmission 300 to be substantially the same or the magnitude relation between the two to be reversed.

When the torque input from the input shaft of the transmission 300 and the load torque are substantially the same, the torque fluctuation in the power transmission path is small. Also, when the magnitude relation between the torque input from the input shaft and the load torque is reversed, torsion decreases because the shaft between the input and output shafts of the transmission 300 starts to twist in the opposite direction.

Therefore, because the force with which the splines on the third speed-fourth speed hub sleeve 312 and the splines formed on the third speed gear 320 are engaged weakens, the shift fork shaft 308 corresponding to the third speed-fourth speed hub sleeve 312 slides toward neutral from the applied force such that the third speed-fourth speed hub sleeve 312 disengages from the third speed gear 320 (i.e., YES in step S114) at time T'(1) which is before time T(1), as shown by the broken line in the bottom section of FIG. 4. At this time, this broken line is compared with the solid lines in the top, middle, and bottom sections of FIG. 4 and the shift can be started earlier by an amount corresponding to the difference of T(1)–T'(1).

As described above, the shift control apparatus according to this example embodiment moves the shift selector shaft so that the gear becomes disengaged when at least one of the drive torque and the transfer torque become equal to or less than the load torque after a shift is required while the vehicle is running. The point at which the drive torque becomes equal to or less than the load torque is the point at which the torque applied to the input shaft of the transmission (i.e., the drive torque or the transfer torque) and the torque applied to the output shaft of the transmission (i.e., the load torque) are substantially equal, or the point at which the magnitude relation between the two reverses. When the torque applied to the input shaft of the transmission becomes substantially the same as the torque applied to the output shaft of the transmission, the torque fluctuation in the power transmission path decreases. Also, when the magnitude relation between the torques applied to the input and output shafts of the transmission reverses, the shaft in the power transmission path inside the transmission twists in the opposite direction so the torsion on the shaft decreases. Shock caused by torque fluctuation can be effectively suppressed at this time by moving the shift selecting member to disengage the gear corresponding to the speed.

Also, as the clutch is released, the transfer torque applied to the input shaft of the transmission decreases and thus quickly becomes less than the load torque. As a result, the operation to release the clutch and the operation to return the shift position to neutral can be performed in parallel because the shift selector shaft starts to be moved quickly. Therefore, the shift selector shaft can quickly start to move to the position corresponding to the speed after the shift. That is, responsiveness of the shift control can be improved. Accordingly, a shift control apparatus can be provided which improves the responsiveness during shift control while suppressing shock caused by a fluctuation in torque during a shift.

Also, even if at least one of the drive torque and the transfer torque does not become equal to or less than the load torque, the shift selector shaft may still move so that the gear corresponding to the speed disengages from the hub sleeve because force corresponding to the speed is being applied to the shift selector shaft.

When the transfer torque and the load torque are substantially the same, the torque fluctuation in the power transmission path is small. Also, when the magnitude relation between the transfer torque and the load torque reverses, the torsion amount for starting to twist the shaft between the input and output shafts of the transmission in the opposite direction decreases. As a result, the torque fluctuation or the torque applied to the gear corresponding to the speed decreases. Therefore, less force is required to disengage the gear so the shift selector shaft moves from the force being applied. Accordingly, the shift selector shaft can be moved at an earlier stage so responsiveness of the shift control can be further improved while effectively suppressing shock caused by torque fluctuation in the power transmission path.

Hereinafter, a shift control apparatus according to a second example embodiment of the invention will be described. The shift control apparatus according to this second example embodiment differs from the shift control apparatus according to the first example embodiment only in that the control structure of the program executed by the ECU 500 is different. All other structure is the same as that of the shift control apparatus according to the first example embodiment described above. Like parts will thus be denoted by like reference numerals and have the same function so detailed descriptions thereof will not be repeated.

In this example embodiment, the ECU 500 which serves as the shift control apparatus switches between a shift control that suppresses shift shock and a shift control for fast shifting depending on whether the driver requires a fast shift.

Figure 5A:
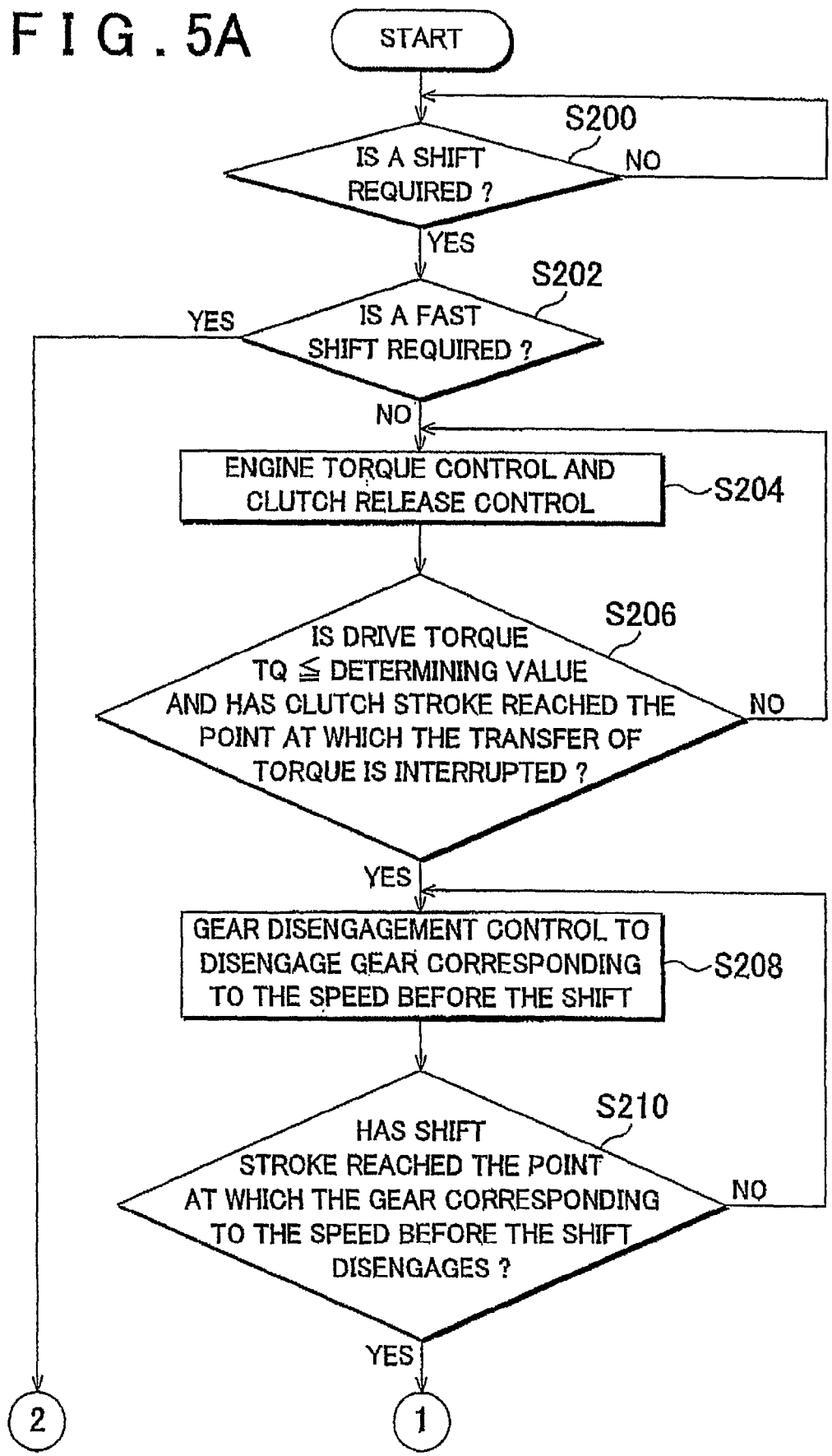
FIGS. 5A and 5B are flowcharts illustrating the control structure of a shift control program to be used when a fast shift is not required, which is executed by an ECU which serves as a shift control apparatus according to a second example embodiment of the invention.
Figure 5B:
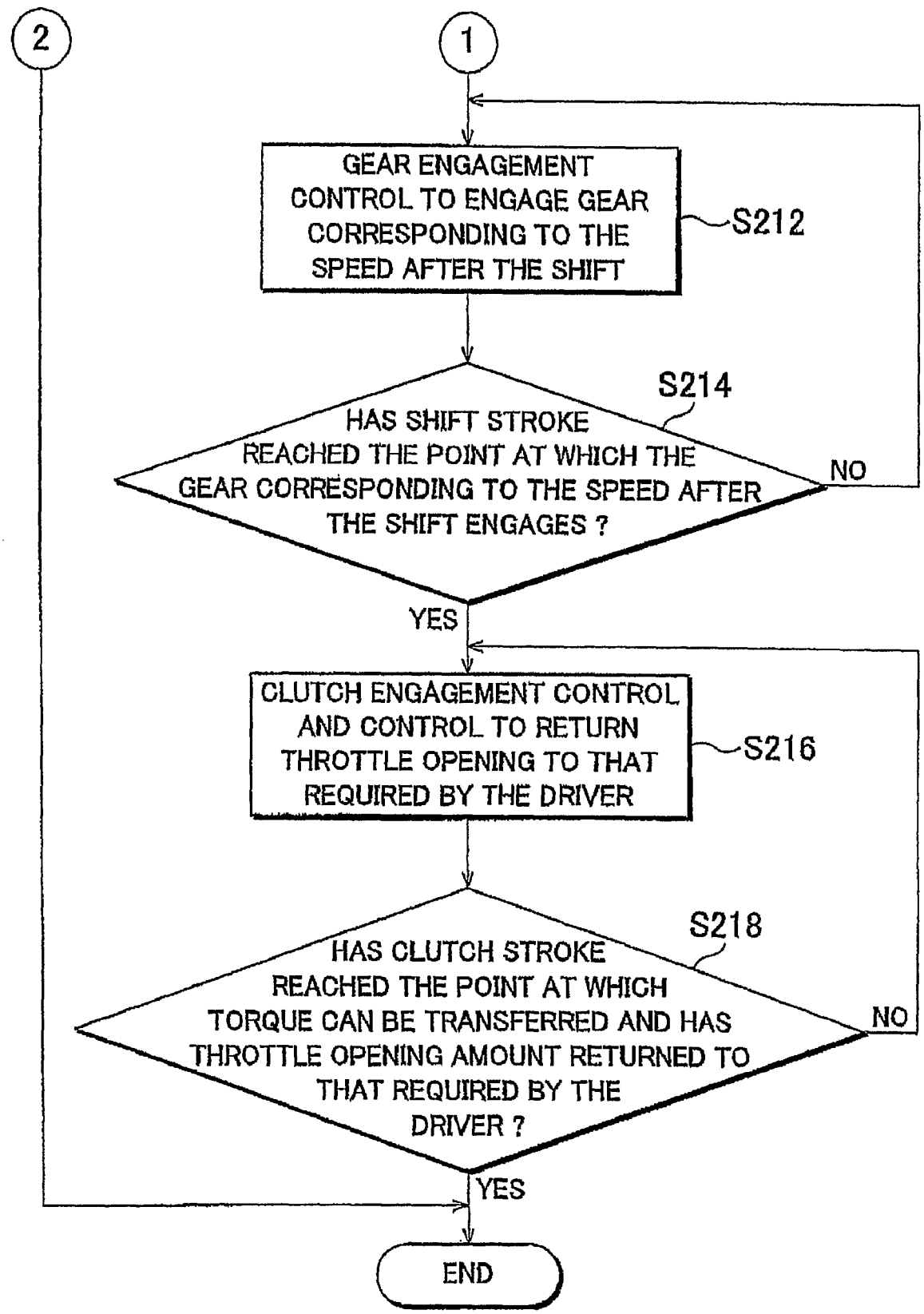

Hereinafter, the control structure of a program for shift control when a fast shift is not required, which is executed by the ECU 500 that serves as the shift control apparatus according to this example embodiment will be described with reference to FIGS. 5A and 5B.

In step S200, the ECU 500 determines whether a shift is required. If a shift is required (i.e., YES in step S200), the process proceeds on to step S202. If not, then step S200 is repeated.

In step S202, the ECU 500 determines whether a fast shift is required. More specifically, the ECU 500 determines whether the driver is requiring a fast shift based on the operating state of an operating device with which the driver can adjust the shifting speed, for example. This operating device may be, for example, a dial or switch that can adjust the shifting speed.

Alternatively, the ECU 500 determines whether the driver is requiring a fast shift based on the accelerator depression amount by the driver or a change in the accelerator depression amount. For example, the ECU 500 determines that the driver is requiring a fast shift when the accelerator depression amount by the driver or a change in the accelerator depression amount is equal to or greater than a predetermined value.

Furthermore, the ECU 500 may determine whether a driver required fast shift can be predicted according to the running state of the vehicle. The running state of the vehicle includes, for example, the vehicle speed, an estimated value of engine torque, road gradient, or map information received from a navigation system. For example, when it is detected that the road on which the vehicle is traveling is an upgrade, the ECU 500 determines that a driver required fast shift can be predicted. If a fast shift is required (i.e., YES in step S202), the routine ends. If not (i.e., NO in step S202), the process proceeds on to step S204.

In step S204, the ECU 500 starts the engine torque control and the clutch release control in parallel. Here, the ECU 500 sends a control signal to the throttle motor to reduce the drive torque TQ of the engine 100, i.e., to reduce the throttle opening amount, as well as sends a control signal to the clutch solenoid valve 222 to release the clutch 200.

In step S206, the ECU 500 determines whether the drive torque TQ of the engine 100 is equal to or less than a determining value, as well as determines whether the clutch stroke has reached the point at which the transfer of torque from the engine 100 to the transmission 300 is interrupted.

The drive torque TQ of the engine may be directly detected or it may be estimated based on the rotation speed of the engine 100, the throttle opening amount, the fuel injection quantity, the intake air quantity and the intake air temperature. The "determining value" is a value that determines whether to start the gear disengagement control taking into account the estimated value of running resistance, the reduction ratio of the drive torque TQ, and the responsiveness of the shift stroke (e.g., a delay with respect to the target shift stroke) and the like. This determining value is set appropriately by testing or the like.

If the drive torque TQ of the engine 100 is equal to or less than the determining value and the clutch stroke has reached the point at which the transfer of torque from the engine 100 is interrupted (i.e., YES in step S206), the process proceeds on to step S208. If not (i.e., NO in step S206), the process returns to step S204.

In step S208, the ECU 500 starts the gear disengagement control so that the splines on the hub sleeve disengage from the splines on the gear corresponding to the speed before the shift. More specifically, the ECU 500 controls the actuator 304 to move the position of the shift fork shaft 308 to the reference position (i.e., neutral) side.

In step S210, the ECU 500 determines whether the shift stroke (i.e., the position of the shift select shaft) has reached the point (position) where the splines on the hub sleeve disengage from the splines on the gear corresponding to the speed before the shift. When the shift stroke has reached the point where the hub sleeve disengages from the gear (i.e., YES in step S210), the process proceeds on to step S212. If not (i.e., NO in step S210), the process returns to step S208.

In step S212, the ECU 500 performs gear engagement control to engage the splines on the hub sleeve with the splines on the gear corresponding to the speed after the shift. More specifically, the ECU 500 controls the actuator 304 to move the shift selector shaft and slide the shift fork shaft 308 corresponding to the speed after the shift, thereby engaging the splines on the hub sleeve with the splines on the gear corresponding to the speed after the shift.

In step S214, the ECU 500 determines whether the shift stroke has reached the point at which the splines on the hub sleeve engage with the splines on the gear corresponding to the speed after the shift. If the shift stroke has reached the point at which the hub sleeve engages with the gear corresponding to the speed after the shift (i.e., YES in step S214), the process proceeds on to step S216. If not (i.e., NO in step S214), the process returns to step S212.

In step S216, the ECU 500 performs clutch engagement control of the clutch 200 and control to return the throttle opening amount to that required by the driver. That is, the ECU 500 sends a control signal to the clutch solenoid valve 222 to move the clutch 200 from a released state to an engaged state. Also, the ECU 500 sends a control signal to the throttle motor to make the throttle opening amount one which corresponds to the operation of the accelerator pedal.

In step S218, the ECU 500 determines whether the clutch stroke has reached the point at which torque can be transferred and whether the throttle opening amount is one which corresponds to the needs of the driver. If the clutch stroke has reached the point at which torque can be transferred and the throttle opening amount is one which corresponds to the needs of the driver (i.e., YES in step S218), the routine ends. If not (i.e., NO in step S218), the process returns to step S216.

The operation of the ECU 500 which serves as the shift control apparatus according to this example embodiment based on the flowchart and the structure described above will now be described.

If, for example, there is a demand for an upshift from third speed to fourth speed (i.e., YES in step S200) but a fast shift is not required (i.e., NO in step S202) based on the operating state of a shifting speed operating device such as a dial or a switch or the like while the vehicle is running, the drive torque TQ of the engine 100 is controlled so that it decreases and the clutch 200 is controlled so that it releases (step S204).

When the drive torque TQ of the engine 100 is equal to or less than the determining value and the clutch stroke has reached the point at which the transfer of torque is interrupted (i.e., YES in step S206), then the gear disengagement control is started to disengage the third speed gear 320 and place the transmission in neutral (step S208).

Then, when the shift stroke reaches the point at which the splines on the third speed-fourth speed hub sleeve 312 disengage from the splines on the third speed gear 320 (i.e., YES in step S210), that shift stroke corresponds to neutral. Then the gear engagement control is started to engage the fourth speed gear 322 (step S212).

When the shift stroke reaches the point at which the splines on the third speed-fourth speed nub sleeve 312 engage with the splines on the fourth speed gear 322 (i.e., YES in step S214), the clutch 200 is controlled so that it engages and the throttle motor is controlled so that the throttle opening amount becomes one which corresponds to the needs of the driver (i.e., the accelerator depression amount). Then when the clutch stroke reaches the point at which torque can be transferred and the throttle opening amount is one which corresponds to the needs of the driver (i.e., YES in step S218), the routine ends.

Figure 6A:
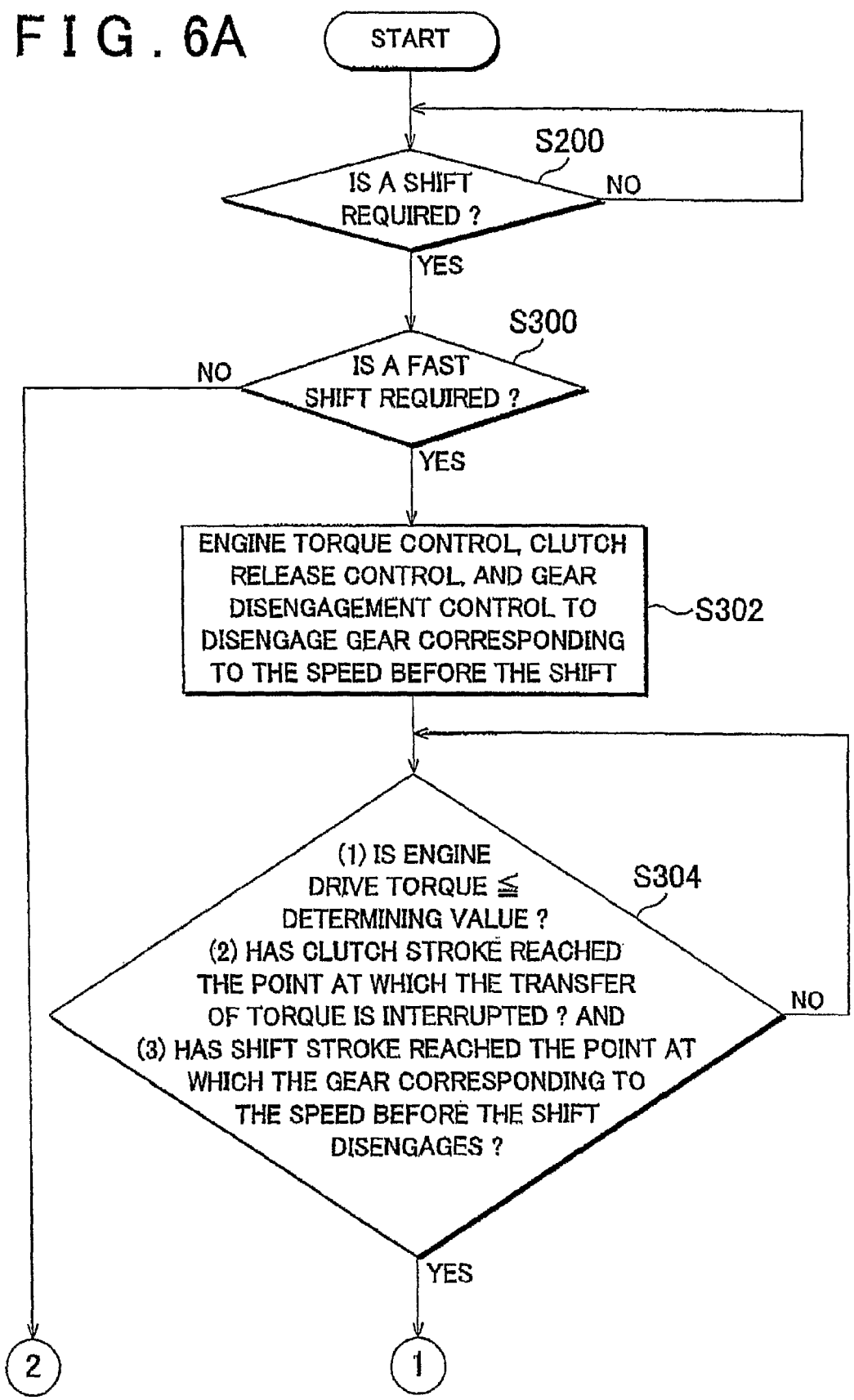
FIGS. 6A and 6B are flowcharts illustrating the control structure of a shift control program to be used when a fast shift is required, which is executed by the ECU which serves as the shift control apparatus according to the second example embodiment of the invention.
Figure 6B:
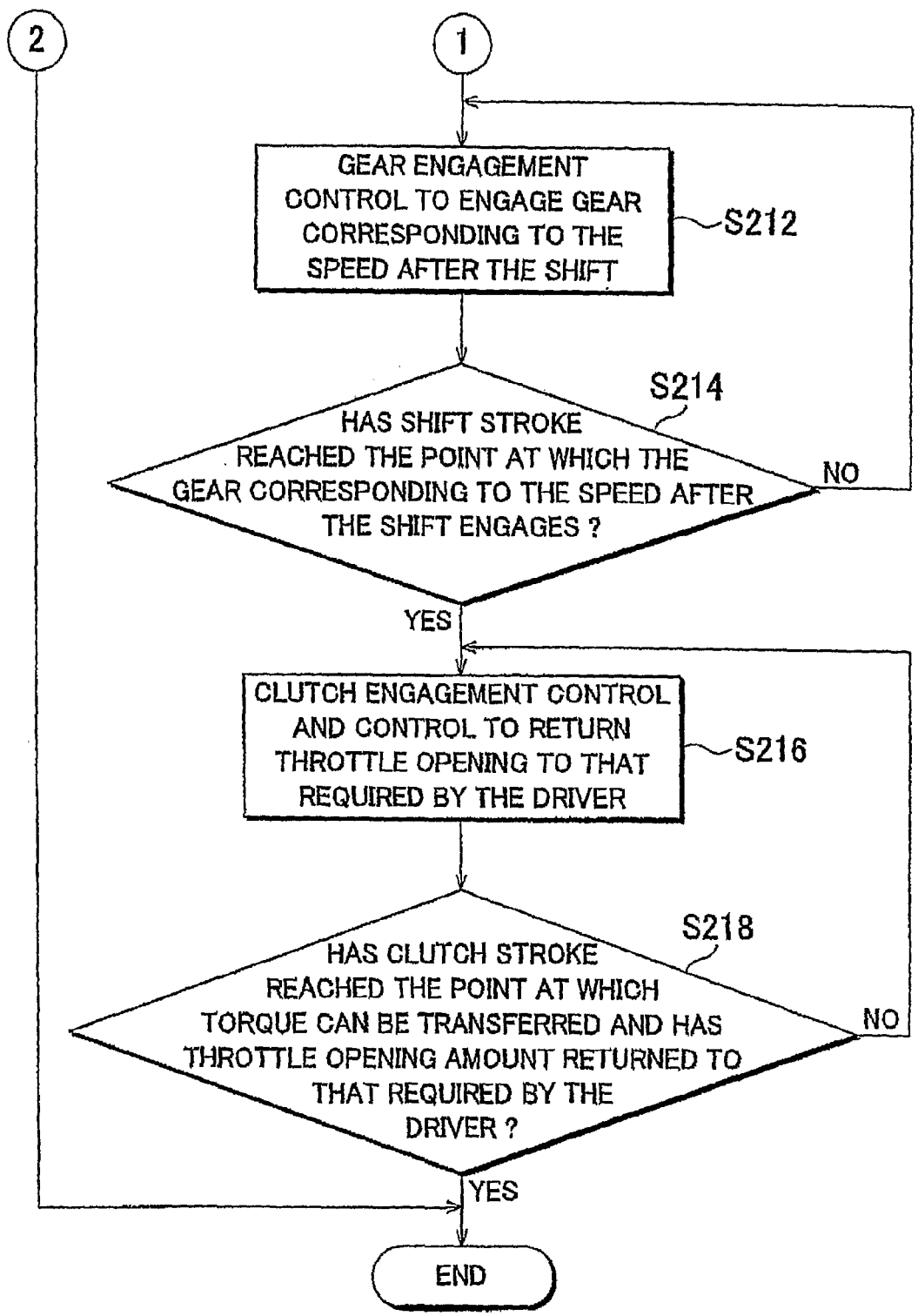

Next, the control structure of a program for shift control when a fast shift is required, which is executed by the ECU 500 that serves as the shift control apparatus according to this example embodiment will be described with reference to FIGS. 6A and 6B. Those steps in the flowchart shown in FIGS. 6A and 6B that are the same as steps in the flowchart shown in FIGS. 5A and 5B will be denoted by like step numbers. The processes of those steps are also the same. Accordingly, detailed descriptions of those steps will be omitted here.

When a shift is required (i.e., YES in step S200), the ECU 500 determines in step S300 whether a fast shift is being required. If a fast shift is being required (i.e., YES in step S300), the process proceeds on to step S302. If not (i.e., NO in step S300), the routine ends.

In step S302, the ECU 500 starts the engine torque control, the clutch release control, and the gear disengagement control in parallel.

In step S304, the ECU 500 determines (1) whether the drive torque TQ of the engine 100 is equal to or less than a determining value, (2) whether the clutch stroke has reached the point at which the transfer of torque from the engine 100 is interrupted, and (3) whether the shift stroke has reached the point at which the splines on the hub sleeve disengage from the splines on the gear corresponding to the speed before the shift. If all of these three conditions (1) to (3) are satisfied (i.e., YES in step S304), the process proceeds on to step S212. If not (i.e., NO in step S304), the process returns to step S302.

Figure 7:
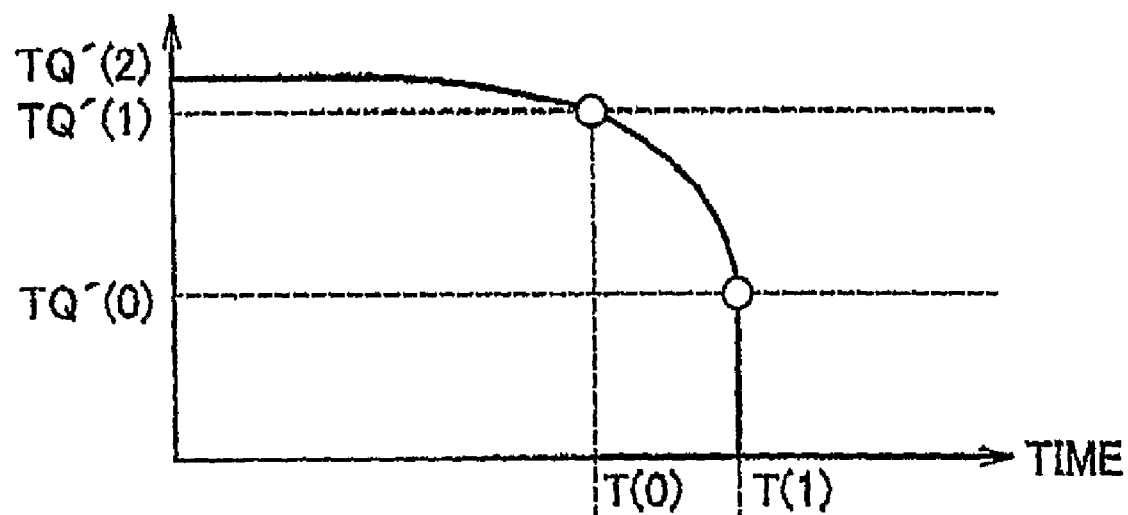
FIG. 7 is a timing chart showing the operation of the ECU which serves as the shift control apparatus according to the second example embodiment of the invention.
Figure 7:
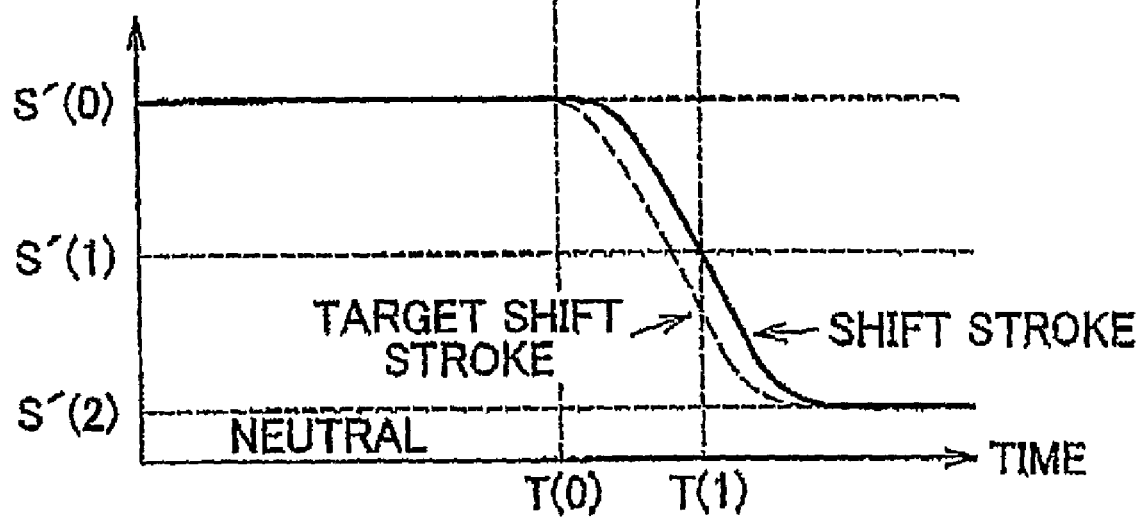

The operation of the ECU 500 that serves as the shift control apparatus according to this example embodiment based on the flowchart and the structure described above will now be described with reference to FIG. 7.

As shown in the top section of IG. 7, while the vehicle is running the drive torque TQ output from the engine 100 is TQ'(2), the clutch stroke is a stroke indicating complete engagement of the clutch 200, and the shift stroke is S(0) indicating third speed.

If an upshift from third speed to fourth speed is required according to the running state of the vehicle or from a shift operation by the driver (i.e., YES in step S200) and a fast shift is required based on the operating state of a shifting speed operating device such as a dial or a switch or the like (i.e., YES in step S300) when the drive torque TQ is TQ'(1) at time T(0), the drive torque TQ of the engine 100 is controlled so that it is reduced, the clutch 200 is controlled so that it is released, and the gear disengagement control is started to disengage the third speed gear 320 and place the transmission in neutral (step S302). When this gear disengagement control is started, the ECU 500 controls the actuator 304 to follow the change in the target shift stroke as shown by the broken line in the bottom section of FIG. 7. At this time the shift stroke changes as illustrated by the solid line in the bottom section of FIG. 7.

If, when the torque TQ of the engine 100 is TQ'(0) at time T(1), that drive torque TQ is equal to or less than the determining value, the clutch stroke has reached the point at which the transfer of torque is interrupted, and the shift stroke has reached S'(1) at which point the splines on the third speed-fourth speed hub sleeve 312 disengage from the splines on the third speed gear 312 (i.e., YES in step S304), then the gear engagement control to engage the fourth speed gear 322 is started (step S212) after the shift stroke has reached S'(2) which corresponds to neutral.

Shock caused by torque fluctuation in the power transmission path when the gear disengages can be suppressed by making the drive torque TQ of the engine 100 substantially the same as the torque transferred from the driven wheels 404 to the transmission 300, which is based on the estimated value of the running resistance, when the shift stroke reaches S'(1).

When the shift stroke reaches the point at which the splines on the third speed-fourth speed hub sleeve 312 engage with the splines on the fourth speed gear 322 (i.e., YES in step S214), the clutch 200 is controlled to engage and the throttle motor is controlled so that the throttle opening amount becomes one which corresponds to the needs of the driver (step S216). Then when the clutch stroke reaches the point at which torque can be transferred and the throttle opening amount becomes one which corresponds to the needs of the driver (i.e., YES in step S218), the routine ends.

As described above, with the shift control apparatus according to this example embodiment, when a fast shift is not required, shift control is performed while the clutch is released (i e., while torque is not being transferred) which enables shock caused by torque fluctuation in the power transmission path during shift control to be suppressed. Also, when a fast shift is required, engine control, clutch control, and shift control are all executed in parallel so shift control can be started earlier than it would be if it were executed after executing the engine control and the clutch control in parallel, which improves the responsiveness of the shift control. In this way, shift control desired by the driver can be realized by switching between a shift that can suppress shift shock and a fast shift depending on the needs of the driver, which reduces the discomfort felt by the driver during a shift.

Preferably, when it is determined that the driver is requiring a fast shift, the start and end of the controls may be overlapped in consideration of the period of time during which there is no response (or the delay time) of the controls. This would enable even faster shifting.

Also, in this example embodiment, the routines in the two flowcharts (i.e., the routine in the flowchart which is executed when a fast shift is required and the routine in the flowchart which is executed when a fast shift is not required) are executed in parallel. However, the invention is not particularly limited to this. For example, the routines in these two flowcharts may be combined into one.

Hereinafter, a shift control apparatus according to a third example embodiment of the invention will be described. The shift control apparatus according to this third example embodiment differs from the shift control apparatus according to the first example embodiment described above in that the control structure of the program for shift control when a fast shift is required, which is executed by the ECU 500 is different. All other structure is the same as that of the shift control apparatus according to the first example embodiment described above. Like parts will thus be denoted by like reference numerals and have the same function so detailed descriptions thereof will not be repeated.

Hereinafter, the control structure of a program for shift control when a fast shift is required, which is executed by the ECU 500 that serves as the shift control apparatus according to this example embodiment will be described with reference to FIGS. 8A and 8B. Those steps in the flowchart shown in FIGS. 8A and 8B that are the same as steps in the flowchart shown in FIGS. 6A and 6B will be denoted by like step numbers. The processes of those steps are also the same. Accordingly, detailed descriptions of those steps will be omitted here, When a shift is required (i.e., YES in step S200) and a fast shift is required (i.e., YES in step S300), the ECU 500 starts the engine torque control in step S400. Then in step S402, the ECU 500 determines whether the drive torque TQ output from the engine 100 is equal to or less than a determining value. If the drive torque TQ of the engine 100 is less than the determining value (i.e., YES in step S402), the process proceeds on to step S404. If not (i.e., NO in step S402), the process returns to step S400.

In step S404, the ECU 500 starts the gear disengagement control to disengage the gear corresponding to the speed before the shift. More specifically, the ECU 500 sends a control signal to the actuator 304 to disengage the splines on the hub sleeve from the splines on the gear corresponding to the speed before the shift.

In step S406, the ECU 500 determines whether the shift stroke has reached the point at which the splines on the hub sleeve disengage from the splines on the gear corresponding to the speed before the shift. If the shift stroke has reached the point at which the splines on the hub sleeve disengage from the splines on the gear corresponding to the speed before the shift (i.e., YES in step S406), the process proceeds on to step S408. If not (i.e., NO in step S406), the process returns to step S404.

In step S408, the ECU 500 controls the speed of the engine 100 by controlling the throttle opening amount so that the input shaft 302 rotates at a speed at which the hub sleeve engages with the gear corresponding to the speed after the shift. The rotation speed of the input shaft 302 at which the hub sleeve engages with the gear corresponding to the speed after the shift is a rotation speed at which it can be predicted that the hub sleeve will engage with the gear corresponding to the speed after the shift without producing any shock.

In step S410, the ECU 500 determines whether the engine 100 has reached the speed at which the hub sleeve and the gear corresponding to the speed after the shift engage. If the engine 100 has reached the speed at which the hub sleeve and the gear corresponding to the speed after the shift engage (i.e., YES in step S410), the process proceeds on to step S412. If not (i.e., NO in step S410), then the process returns to step S408.

In step S412, the ECU 500 determines whether the rotation of the input shaft 302 and the rotation of the output shaft 306 are in synch. More specifically, the ECU 500 determines whether the rotation speed of the gear side corresponding to the speed after the shift and the rotation speed of the hub sleeve side are substantially the same. If the rotation of the input shaft 302 and the rotation of the output shaft 306 are substantially the same (i.e., YES in step S412), the process proceeds on to step S212. If not (i.e., NO in step S412), the process proceeds on to step S414.

In step S414, the ECU 500 starts the control to release the clutch 200. Then in step S416, the ECU 500 determines whether the clutch stroke has reached the point at which the transfer of torque from the engine 100 is interrupted. If the clutch stroke has reached the point at which the transfer of torque from the engine 100 is interrupted (i.e., YES in step S416), the process proceeds on to step S212. If not (i.e., NO in step S416), the process returns to step S414.

The operation of the ECU 500 which serves as the shift control apparatus according to this example embodiment based on the flowchart and the structure described above will now be described.

If, for example, there is a demand for an upshift from third speed to fourth speed (i.e., YES in step S200) and a fast shift is required (i.e., YES in step S300) based on the operating state of a shifting speed operating device such as a dial or a switch or the like while the vehicle is running, the drive torque TQ of the engine 100 is controlled so that it decreases (step S400). If the drive torque TQ of the engine 100 is equal to or less than a determining value (i e., YES in step S402), the gear disengagement control is started to disengage the third speed gear 320 and place the transmission in neutral (step S404).

When the shift stroke reaches the point at which the third speed-fourth speed hub sleeve 312 disengages from the third speed gear 320 (i.e., YES in step S406), the input shaft rotation speed is controlled by throttle control to a speed at which the third speed-fourth speed hub sleeve 312 engages with the fourth speed gear 322 (step S408).

Once the rotation speed of the input shaft 302 reaches the speed at which the third speed-fourth speed hub sleeve 312 engages with the fourth speed gear 322 (i.e., YES in step S410), the gear engagement control is started to engage the fourth speed gear 322 (step S212) as long as the rotation speed of the input shaft 302 and the rotation speed of the output shaft 306 are in synch (i.e., YES in step S412).

If, on the other hand, the rotation speed of the input shaft 302 and the rotation speed of the output shaft 306 are not in synch (i.e., NO in step S412), the clutch 200 is controlled to release (step S414). When the clutch stroke reaches the point (position) at which the transfer of torque is interrupted (i.e., YES in step S416), the gear engagement control is started to engage the fourth speed gear 322 (step S212).

When the shift stroke reaches the point at which the third speed-fourth speed hub sleeve 312 engages with the fourth speed gear 322 (i.e., YES in step S214), the clutch 200 is controlled to engage and the throttle motor is controlled so that the throttle opening amount becomes one which corresponds to the needs of the driver (i.e., the accelerator depression amount) (step S216). Then when the clutch stroke reaches the point at which torque can be transferred and the throttle opening amount becomes one which corresponds to the needs of the driver (i.e., YES in step S218), the routine ends.

As described above, the shift control apparatus according to this example embodiment not only displays the advantages of the shift control apparatus according to the second example embodiment, but also obviates the need for the clutch release control when the rotation of the input shaft 302 and the rotation of the output shaft 306 are in synch. Furthermore, the shift control apparatus according to this example embodiment is able to reduce the number of rotations that it takes to synchronize the rotation speed of the input shaft and the rotation speed of the output shaft by operating the synchromesh mechanism, which shortens the shifting time and suppresses degradation of the synchromesh mechanism. As a result, the durability of the synchromesh mechanism can be improved.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

What is claimed is:

1. A shift control apparatus of a constant mesh transmission which is connected via a clutch to a power source mounted in a vehicle, the transmission shifting speeds by a gear corresponding to a desired speed being engaged when a shift selecting member is moved to a position corresponding to the desired speed, comprising:
   a drive torque detecting device that detects drive torque output from the power source;
   a transfer torque detecting device that detects transfer torque transferred from the clutch to the transmission;
   a load torque detecting device that detects load torque transferred from a driven wheel of the vehicle to the transmission;
   a switching device that switches the clutch from an engaged state to a released state when the shift is required while the vehicle is running; and
   a first shift controlling device that controls, in parallel with switching the clutch, the shift selecting member such that the engaged gear disengages when the load torque becomes greater than at least one of the drive torque and the transfer torque.

2. The shift control apparatus of a constant mesh transmission according to claim 1, further comprising:
   a drive torque controlling device that controls the drive torque output from the power source when a shift is required.

3. A shift control apparatus of a constant mesh transmission which is connected via a clutch to a power source mounted in a vehicle, the transmission shifting speeds by a gear corresponding to a desired speed being engaged when a shift selecting member is moved to a position corresponding to the desired speed, comprising:
   an applying device that applies a force corresponding to a speed in a direction in which the engaged gear disengages to the shift selecting member when the shift is required while the vehicle is running;
   a switching device that switches the clutch from an engaged state to a released state in parallel with applying the force corresponding to the speed;
   a position detecting device that detects a position of the shift selecting member; and
   a second shift controlling device that moves the shift selecting member to a position corresponding to a speed after a shift when the detected position is the position at which the engaged gear disengages in the speed before the shift.

4. The shift control apparatus of a constant mesh transmission according to claim 3, wherein the force corresponding to the speed is a force required to move the shift selecting member when the gear corresponding to the speed changes from being engaged to being disengaged, and is calculated based on load torque transferred from a driven wheel to the transmission by running resistance of the vehicle.

5. The shift control apparatus of a constant mesh transmission according to claim 3, further comprising:
   a torque detecting device that detects drive torque output from the power source; and
   a third shift controlling device that, when a gear corresponding to the speed before the shift is engaged and the detected drive torque is equal to or less than a load torque transferred from a driven wheel of the vehicle to the transmission, moves the shift selecting member to disengage the engaged gear.

6. The shift control apparatus of a constant mesh transmission according to claim 3, further comprising:
   a transfer torque detecting device that detects transfer torque transferred from the clutch to the transmission; and
   a fourth shift controlling device that, when a gear corresponding to the speed before the shift is engaged and the detected transfer torque is equal to or less than a load torque transferred from a driven wheel of the vehicle to the transmission, moves the shift selecting member to disengage the engaged gear.

7. The shift control apparatus of a constant mesh transmission according to claim 3, further comprising:
   a drive torque controlling device that controls the drive torque output from the power source when the shift is required.

8. The shift control apparatus of a constant mesh transmission according to claim 7, wherein in the transmission, when a fast shift is required, the switching of the clutch from the engaged state to the released state by the switching device, the drive torque control of the power source by the drive torque controlling device, and the shift control by the second shift controlling device or a third shift controlling device or a fourth shift controlling device are executed in parallel, and when the fast shift is not required, the shift control by the second shift controlling device or the third shift controlling device or the fourth shift controlling device is executed after the switching device switches the clutch from the engaged state to the released state.

9. The shift control apparatus of a constant mesh transmission according to claim 7, wherein in the transmission, when a fast shift is required, a shift is executed, without control to release the clutch, by controlling the power source after a gear corresponding to the speed before the shift is disengaged and controlling an input shaft rotation speed before the shift of the transmission to the input shaft rotation speed of the speed after the shift, and when the fast shift is not required, shift control is executed by the second shift controlling device or a third shift controlling device or a fourth shift controlling device after the switching device switches the clutch from the engaged state to the released state.

* * * * *